US009936030B2

(12) United States Patent
Laliberte

(10) Patent No.: US 9,936,030 B2
(45) Date of Patent: *Apr. 3, 2018

(54) USER CONTENT SHARING SYSTEM AND METHOD WITH LOCATION-BASED EXTERNAL CONTENT INTEGRATION

(71) Applicant: Investel Capital Corporation, Vancouver (CA)

(72) Inventor: Benoit Laliberte, Mont St-Hilaire (CA)

(73) Assignee: Investel Capital Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,515

(22) Filed: Aug. 18, 2016

(65) Prior Publication Data

US 2016/0359987 A1 Dec. 8, 2016

Related U.S. Application Data

(63) Continuation of application No. 15/200,631, filed on Jul. 1, 2016, which is a continuation-in-part of
(Continued)

(30) Foreign Application Priority Data

Sep. 10, 2014 (CA) ..................................... 2863124

(51) Int. Cl.
*G06F 15/16* (2006.01)
*H04L 29/08* (2006.01)
(Continued)

(52) U.S. Cl.
CPC ............ *H04L 67/18* (2013.01); *G06F 3/0482* (2013.01); *G06F 17/3087* (2013.01);
(Continued)

(58) Field of Classification Search
CPC ......... H04L 12/58; H04L 51/32; H04L 67/06; G06Q 30/02
(Continued)

(56) References Cited

U.S. PATENT DOCUMENTS 5,491,782 A 2/1996 King et al.
5,883,639 A 3/1999 Walton et al.
(Continued)

FOREIGN PATENT DOCUMENTS

CA 2929013 C 8/2017
WO 2001029642 A1 4/2001
(Continued)

OTHER PUBLICATIONS

Australian Patent Application 2016101474, Examination Report, dated Mar. 16, 2017 (10 pages).
(Continued)

*Primary Examiner* — Frantz Jean
(74) *Attorney, Agent, or Firm* — Greer, Burns & Crain, LTD

(57) ABSTRACT

Described are various embodiments of a user content sharing system and method with automated external content integration. In one embodiment, a system and method are provided in which a graphical user interface (GUI) is rendered on each system users' personal communication device. The GUI produces a content selection function selecting, under user operation, user content for sharing, and a sharing platform selection function selecting, under user operation, one or more sharing platforms. The system further comprise a digital content integrator communicatively linked to the user interface to gain access to the selected user content in response to the content selection function, the integrator having access to stored external content distinct from user content. The integrator integrates the external
(Continued)

content with the selected user content to output integrated content. The system further comprises a communication interface communicatively linked to the integrator and selectively operable to interface with each of the distinct content sharing platforms, wherein the integrated content is concurrently relayed to the selected sharing platforms via the communication interface on behalf of system users as originating therefrom.

16 Claims, 24 Drawing Sheets

Related U.S. Application Data application No. PCT/CA2014/051268, filed on Dec. 30, 2014.

(60) Provisional application No. 61/923,315, filed on Jan. 3, 2014.

(51) Int. Cl.
  *H04L 12/58* (2006.01)
  *G06Q 30/02* (2012.01)
  *H04L 12/16* (2006.01)
  *H04W 4/00* (2018.01)
  *H04W 4/14* (2009.01)
  *H04W 12/08* (2009.01)
  *G06F 3/0482* (2013.01)
  *G06F 17/30* (2006.01)

(52) U.S. Cl.
  CPC ....... *G06F 17/30312* (2013.01); *G06Q 30/02* (2013.01); *H04L 12/16* (2013.01); *H04L 51/00* (2013.01); *H04L 51/32* (2013.01); *H04L 67/02* (2013.01); *H04L 67/06* (2013.01); *H04L 67/10* (2013.01); *H04L 67/22* (2013.01); *H04W 4/00* (2013.01); *H04W 4/14* (2013.01); *H04W 12/08* (2013.01)

(58) Field of Classification Search
  USPC .......... 719/217; 709/213, 203, 231; 707/769
  See application file for complete search history.

(56) References Cited

U.S. PATENT DOCUMENTS

| | | | |
|---|---|---|---|
| 5,893,132 A | 4/1999 | Huffman et al. | |
| 5,999,932 A | 12/1999 | Paul | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,484,196 B1 | 11/2002 | Maurille | |
| 6,665,531 B1 | 12/2003 | Gustafsson | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 7,020,494 B2 | 3/2006 | Spriestersbach et al. | |
| 7,085,604 B2 | 8/2006 | Turney et al. | |
| 7,124,164 B1 | 10/2006 | Chemtob | |
| 7,149,893 B1 | 12/2006 | Leonard et al. | |
| 7,203,380 B2 | 4/2007 | Chiu et al. | |
| 7,356,564 B2 | 4/2008 | Hartselle et al. | |
| 7,366,307 B2 | 4/2008 | Yanz et al. | |
| 7,519,670 B2 | 4/2009 | Hagale et al. | |
| 7,562,310 B2 | 7/2009 | Champion et al. | |
| 7,639,943 B1 | 12/2009 | Kalajan | |
| 7,765,491 B1 | 7/2010 | Cotterill | |
| 8,001,204 B2 | 8/2011 | Burtner et al. | |
| 8,098,904 B2 | 1/2012 | Ioffe et al. | |
| 8,112,716 B2 | 2/2012 | Kobayashi | |
| 8,136,028 B1 | 3/2012 | Loeb et al. | |
| 8,161,417 B1 | 4/2012 | Lee | |
| 8,195,203 B1 | 6/2012 | Tseng | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |
| 8,379,130 B2 | 2/2013 | Forutanpour et al. | |
| 8,385,950 B1 | 2/2013 | Wagner et al. | |
| 8,405,773 B2 | 3/2013 | Hayashi et al. | |
| 8,418,067 B2 | 4/2013 | Cheng et al. | |
| 8,471,914 B2 | 6/2013 | Sakiyama et al. | |
| 8,554,627 B2 | 10/2013 | Svendsen et al. | |
| 8,560,612 B2 | 10/2013 | Kilmer et al. | |
| 8,627,232 B2 | 1/2014 | Stiso et al. | |
| 8,744,523 B2 | 6/2014 | Fan et al. | |
| 8,775,972 B2 | 7/2014 | Spiegel | |
| 8,788,680 B1 | 7/2014 | Naik | |
| 8,797,415 B2 | 8/2014 | Arnold | |
| 8,856,349 B2 | 10/2014 | Jain et al. | |
| 9,015,285 B1 | 4/2015 | Ebsen et al. | |
| 9,123,074 B2 | 9/2015 | Jacobs | |
| 9,143,681 B1 | 9/2015 | Ebsen et al. | |
| 9,225,897 B1 | 12/2015 | Sehn | |
| 9,355,412 B2 | 5/2016 | Jacobs | |
| 9,459,778 B2 | 10/2016 | Hogeg et al. | |
| 9,639,866 B2 | 5/2017 | Jacobs | |
| 2002/0047868 A1 | 4/2002 | Miyazawa | |
| 2002/0097257 A1 | 7/2002 | Miller et al. | |
| 2002/0122659 A1 | 9/2002 | McGrath et al. | |
| 2002/0144154 A1 | 10/2002 | Tomkow | |
| 2003/0001846 A1 | 1/2003 | Davis et al. | |
| 2003/0016247 A1 | 1/2003 | Lai et al. | |
| 2003/0052925 A1 | 3/2003 | Daimon et al. | |
| 2003/0126215 A1 | 7/2003 | Udell et al. | |
| 2003/0148773 A1 | 8/2003 | Spriestersbach et al. | |
| 2003/0164856 A1 | 9/2003 | Prager et al. | |
| 2003/0229607 A1 | 12/2003 | Zellweger et al. | |
| 2004/0027371 A1 | 2/2004 | Jaeger | |
| 2004/0111467 A1 | 6/2004 | Willis | |
| 2004/0203959 A1 | 10/2004 | Coombes | |
| 2004/0243531 A1 | 12/2004 | Dean | |
| 2005/0022211 A1 | 1/2005 | Veselov et al. | |
| 2005/0078804 A1 | 4/2005 | Yomoda | |
| 2005/0097176 A1 | 5/2005 | Schatz et al. | |
| 2005/0104976 A1 | 5/2005 | Currans | |
| 2005/0114783 A1 | 5/2005 | Szeto | |
| 2005/0122405 A1 | 6/2005 | Voss et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson et al. | |
| 2005/0223066 A1 | 10/2005 | Buchheit et al. | |
| 2006/0107297 A1 | 5/2006 | Toyama et al. | |
| 2006/0114338 A1 | 6/2006 | Rothschild | |
| 2006/0270419 A1 | 11/2006 | Crowley et al. | |
| 2007/0040931 A1 | 2/2007 | Nishizawa | |
| 2007/0073823 A1 | 3/2007 | Cohen et al. | |
| 2007/0082707 A1 | 4/2007 | Flynt et al. | |
| 2007/0192128 A1 | 8/2007 | Celestini | |
| 2007/0208751 A1 | 9/2007 | Cowan et al. | |
| 2007/0214216 A1 | 9/2007 | Carrer et al. | |
| 2007/0233801 A1 | 10/2007 | Eren et al. | |
| 2007/0243887 A1 | 10/2007 | Bandhole et al. | |
| 2007/0255456 A1 | 11/2007 | Funayama | |
| 2007/0299833 A1 | 12/2007 | Viljamaa et al. | |
| 2008/0025701 A1 | 1/2008 | Ikeda | |
| 2008/0033930 A1 | 2/2008 | Warren | |
| 2008/0104503 A1 | 5/2008 | Beall et al. | |
| 2008/0109363 A1 | 5/2008 | Fassett | |
| 2008/0147730 A1 | 6/2008 | Lee et al. | |
| 2008/0148150 A1 | 6/2008 | Mall | |
| 2008/0162228 A1 | 7/2008 | Mechbach et al. | |
| 2008/0195664 A1* | 8/2008 | Maharajh | G06F 17/30035 |
| 2008/0201225 A1 | 8/2008 | Maharajh et al. | |
| 2008/0207176 A1 | 8/2008 | Brackbill et al. | |
| 2008/0214210 A1 | 9/2008 | Rasanen et al. | |
| 2008/0222545 A1 | 9/2008 | Lemay et al. | |
| 2008/0242280 A1 | 10/2008 | Shapiro et al. | |

(56) References Cited

U.S. PATENT DOCUMENTS

| | | |
|---|---|---|
| 2008/0256446 A1 | 10/2008 | Yamamoto |
| 2008/0256489 A1 | 10/2008 | Maurer et al. |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1* | 1/2009 | Rothschild ............ G06Q 30/02 705/14.1 |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0063449 A1 | 3/2009 | van Zwol |
| 2009/0079846 A1 | 3/2009 | Chou |
| 2009/0089710 A1 | 4/2009 | Wood et al. |
| 2009/0132453 A1 | 5/2009 | Hangartner et al. |
| 2009/0132665 A1 | 5/2009 | Thomsen et al. |
| 2009/0157450 A1 | 6/2009 | Athsani et al. |
| 2009/0160970 A1 | 6/2009 | Fredlund et al. |
| 2009/0163182 A1 | 6/2009 | Gatti et al. |
| 2009/0232354 A1 | 9/2009 | Camp, Jr. et al. |
| 2009/0234815 A1 | 9/2009 | Boerries et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2010/0050127 A1 | 2/2010 | Peng |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0159944 A1 | 6/2010 | Pascal et al. |
| 2010/0161831 A1 | 6/2010 | Haas et al. |
| 2010/0185665 A1 | 7/2010 | Horn et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0102630 A1 | 5/2011 | Rukes |
| 2011/0145070 A1 | 6/2011 | Wolinsky et al. |
| 2011/0145564 A1 | 6/2011 | Moshir et al. |
| 2011/0164163 A1 | 7/2011 | Bilbrey et al. |
| 2011/0197194 A1 | 8/2011 | Lau et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0258050 A1 | 10/2011 | Chan et al. |
| 2011/0273575 A1 | 11/2011 | Lee |
| 2011/0283188 A1 | 11/2011 | Farrenkopf et al. |
| 2011/0310131 A1 | 12/2011 | Ferganson et al. |
| 2011/0320373 A1 | 12/2011 | Lee et al. |
| 2012/0028659 A1 | 2/2012 | Whitney et al. |
| 2012/0059722 A1 | 3/2012 | Rao |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113272 A1 | 5/2012 | Hata |
| 2012/0123830 A1 | 5/2012 | Svendsen et al. |
| 2012/0124126 A1 | 5/2012 | Alcazar et al. |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0144282 A1 | 6/2012 | Loeb et al. |
| 2012/0150978 A1 | 6/2012 | Monaco et al. |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0210244 A1 | 8/2012 | Benco |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0278387 A1 | 11/2012 | Garcia et al. |
| 2012/0278692 A1 | 11/2012 | Shi |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0323933 A1 | 12/2012 | He et al. |
| 2013/0002729 A1 | 1/2013 | Lee et al. |
| 2013/0006759 A1 | 1/2013 | Srivastava et al. |
| 2013/0036364 A1 | 2/2013 | Johnson |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0099829 A1 | 4/2013 | Vilander et al. |
| 2013/0117378 A1 | 5/2013 | Kotorov et al. |
| 2013/0128059 A1 | 5/2013 | Kristensson |
| 2013/0129252 A1 | 5/2013 | Lauper et al. |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0211919 A1 | 8/2013 | Doherty |
| 2013/0222323 A1 | 8/2013 | McKenzie |
| 2013/0227476 A1 | 8/2013 | Frey |
| 2013/0232194 A1 | 9/2013 | Knapp et al. |
| 2013/0239057 A1 | 9/2013 | Ubillos et al. |
| 2013/0263031 A1 | 10/2013 | Oshiro et al. |
| 2013/0265450 A1 | 10/2013 | Barnes |
| 2013/0290443 A1 | 10/2013 | Collins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0096029 A1 | 4/2014 | Schultz |
| 2014/0104312 A1 | 4/2014 | Zaltzman et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0176732 A1 | 6/2014 | Cohen et al. |
| 2014/0189592 A1 | 7/2014 | Benchenaa et al. |
| 2014/0207679 A1 | 7/2014 | Cho |
| 2014/0214471 A1 | 7/2014 | Schreiner |
| 2014/0279016 A1 | 9/2014 | Capel et al. |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0317112 A1* | 10/2014 | Maharajh ......... G06F 17/30035 707/736 |
| 2014/0317302 A1 | 10/2014 | Naik |
| 2014/0325383 A1 | 10/2014 | Brown et al. |
| 2014/0368525 A1 | 12/2014 | Faaborg et al. |
| 2015/0046278 A1 | 2/2015 | Pei et al. |

(56) References Cited

U.S. PATENT DOCUMENTS

| | | | |
|---|---|---|---|
| 2015/0087224 A1* | 3/2015 | Maharajh | G06F 17/30035 455/3.06 |
| 2015/0116529 A1 | 4/2015 | Wu et al. | |
| 2015/0169169 A1 | 6/2015 | Andersson | |
| 2015/0172534 A1 | 6/2015 | Miyakawa et al. | |
| 2015/0206349 A1* | 7/2015 | Rosenthal | H04N 21/41407 345/633 |
| 2015/0213001 A1* | 7/2015 | Levy | G06F 17/3005 715/202 |
| 2015/0220262 A1 | 8/2015 | Patel et al. | |
| 2015/0222814 A1 | 8/2015 | Li et al. | |
| 2015/0294349 A1 | 10/2015 | Capel et al. | |
| 2015/0309707 A1 | 10/2015 | Andersson | |

FOREIGN PATENT DOCUMENTS

| | | |
|---|---|---|
| WO | 2013008238 A1 | 1/2013 |
| WO | WO2013008238 A1 | 1/2013 |

OTHER PUBLICATIONS

Australian Patent Application 2016101473, Examination Report, dated Mar. 16, 2017 (10 pages).

Australian patent application 2016101473, Examination Report, 3 pages (dated Oct. 14, 2016).

Court File No. T-1406-16—*Investel Capital Corporation* v. *Snapchat, Inc.*—The Federal Court of Canada, Investel Capital "Statement of Claim," claiming, inter alia, infringement of Canadian Patent No. 2,887,596, 9 pages, Vancouver, British Columbia (Aug. 22, 2016).

Carthy, Roi "Dear All Photo Apps: Mobli Just Won Filters", Sep. 8, 2011, pp. 1-4, http://techcrunch.com/2011/09/08/mobli-filters/.

Khan, Sameed "Top 10 Android Apps for Photo Editing, Styling and Sharing", Jun. 7, 2011, pp. 1-20, http://www.addictivetips.com/mobile/top-10-android-apps-for-photo-editing-styling-and-sharing/.

Court File No. T-1406-16—*Investel Capital Corporation* v. *Snapchat, Inc.*—The Federal Court of Canada, Snapchat, "Amended Statement of Defence and Counterclaim" alleging, inter alia, claims of Canadian Patent No. 2,887,596 are obvious in light of alleged publications and public uses listed in Schedules A and B, 12 pages (Sep. 7, 2017).

U.S. Appl. No. 15/200,631, Office Action, 15 pages (dated Sep. 21, 2017).

European Patent Application 14876912.8, European Search Report, dated Jul. 21, 2017 (13 pages).

Court File No. T-1406-16—*Investel Capital Corporation* v. *Snapchat, Inc.*—The Federal Court of Canada, Snapchat, "Statement of Defence and Counterclaim" alleging, inter alia, claims of Canadian Patent No. 2,887,596 are obvious in light of alleged publications and public uses listed in Schedules A and B, 12 pages (Nov. 30, 2016).

Court File No. T-1406-16—*Investel Capital Corporation* v. *Snapchat, Inc.*—The Federal Court of Canada, Snapchat, "Statement of Defence and Counterclaim," Schedule A, Ref. 10: "Adding photos to your listing," Internet Archive Wayback Machine http://pages.ebay.com/help/sell/pictures.html (Sep 10, 2013), https://web.archive.org/web/20130910194526/http:/pages.ebay.com/help/sell/pictures/html, 4 pages (upper left corner says "Oct. 5, 2016")(First page "Schedule 2").

Court File No. T-1406-16—*Investel Capital Corporation* v. *Snapchat, Inc.*—The Federal Court of Canada, Snapchat, "Statement of Defence and Counterclaim," Schedule B, Ref. 12: "Blogstomp: A Must Have Blogging Tool for any Wedding Photographer!," 2 pages (p. 1 says Published on Mar. 25, 2013) (First page "Schedule 3").

Court File No. T-1406-16—*Investel Capital Corporation* v. *Snapchat, Inc.*—The Federal Court of Canada, Snapchat, "Statement of Defence and Counterclaim," Schedule B, Ref. 13: ROHIT TRIPATHI, "Watermark Images in PHP and Save File on Server", online: http://code.rohitink.com/2012/12/28/watermark-images-in-php-and-save-file-on-server, 3 pages (printed Nov. 22, 2016, p. 2 says "Posted on Dec. 28, 2012").

Court File No. T-1406-16—*Investel Capital Corporation* v. *Snapchat, Inc.*—The Federal Court of Canada, Information provided by Snapchat regarding select references listed in Schedules A and B of Snapchat "Statement of Defence and Counterclaim," 1 page (Feb. 7, 2017).

PCT/CA2014/051268, International Search Report, 2 pages (dated Mar. 19, 2015).

PCT/CA2014/051268, Written Opinion, 4 pages (dated Mar. 19, 2015).

Court File No. T-1406-16—*Investel Capital Corporation* v. *Snapchat, Inc.*—The Federal Court of Canada, Snapchat, "Statement of Defence and Counterclaim," Schedule A, Ref. 9: "Daily App: InstaPlace (iOS/Android): Give Pictures a Sense of Place," TechPP, http://techpp.com/2013/02/15/instaplace-app-review/ (upper left corner says "Sep. 26, 2016"), and "Android App Review Thailand" Instaplace now available on Android Google Play store, http://www.android-free-app-review.com/2013/01/instaplace-android-google-play-store.html (p. 10 says "Jan. 23, 2013") 18 pages (First p. "Schedule 1").

* cited by examiner

USER CONTENT SHARING SYSTEM AND METHOD WITH LOCATION-BASED EXTERNAL CONTENT INTEGRATION

CROSS REFERENCE TO RELATED APPLICATIONS

This application is a continuation of pending U.S. patent application Ser. No. 15/200,631, filed Jul. 1, 2016, which is a continuation-in-part of pending International Application No. PCT/CA2014/051268, filed Dec. 30, 2014, which claims the benefit of U.S. Provisional Patent Application No. 61/923,315, filed Jan. 3, 2014, and Canadian Patent Application No. 2,863,124, filed Sep. 10, 2014, all of which are incorporated herein by reference in their entireties.

FIELD OF THE DISCLOSURE

The present disclosure relates to user content sharing systems and methods, and, in particular, to a user content sharing system and method with automated external content integration.

BACKGROUND

Sharing of user content over a communication network has become commonplace, be it via social media sites, platforms and/or applications (e.g. Facebook™, LinkedIn™, Twitter™, Pinterest™, etc.), via shared online or Web platforms (e.g. publicly accessible websites, blogs, chats, etc.), via online media distribution channels or platforms (e.g. YouTube), and more traditional network communication mediums such as email, text, etc.

To date, user content is generally juxtaposed to, or published side by side with external content that is controlled and managed by the service provider associated with the user content sharing platform in question. Accordingly, users generally gain free access to the sharing platform in exchange for having this external content associated with their content at the expense of the external content provider and to the profit of the service provider. Generally, the user has no control over the external content being presented in parallel with their content. This external content may nonetheless be targeted to the user and/or the user's audience, for example based on demographic, social, public and/or extracted data automatically gathered and associated with the user.

In one particular example described in U.S. Patent Application No. 2008/0162228, a user content production platform can be used to integrate selectable advertising content within the user content produced therewith. In exchange of integrating advertising content, the user may be provided free access to the production platform and ad-revenue-sponsored access to licensing rights for copyrighted materials used in the user content so produced (e.g. copyrighted audio/video/image content).

In another example described in U.S. Pat. No. 8,554,627, a patron at a given establishment may be invited to 'check-in' to this establishment via a 'status update' on their social profile, wherein a picture of the patron at the establishment may be inserted into a photo ad template and posted as the status update.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for a user content sharing system and method with automated external content integration that overcomes some of the drawbacks of known techniques, or at least, provides a useful alternative thereto. Some aspects of this disclosure provide examples of such systems and methods.

In accordance with one aspect, there is provided a system for sharing digital user content via a content sharing platform, the system comprising: an input communication interface communicating with respective user client devices to access therefrom user-selected content to be shared via the content sharing platform, and further access therefrom a user-selected integrated external content preference selected from a plurality of such preferences; a server-accessible storage having stored thereon a plurality of external content items each having at least one of said preferences associated therewith; an external content integration engine operated by a digital data processor to integrate a selected external content item corresponding with said user-selected preference with said user-selected content to output a sharable integrated content item; and an output communication interface interfacing with the content sharing platform to relay said sharable integrated content item to be shared thereon on behalf of said user as originating therefrom.

In accordance with another aspect, there is provided a server-based method for automatically integrating external content within a user's shared content, the method comprising automatically: receiving as input user-selected content and user selection of a destination third-party server-based content sharing platform therefor; selecting an external content item for integration with said user-selected content; integrating said selected external content item with said user-selected content to output a sharable integrated content item; relaying said integrated content item to said destination third-party server-based content sharing platform to be shared thereon on behalf of said user as originating therefrom; and incrementing a tracking value associated with the user based at least in part on a number of user-selected content items selected thereby for sharing post external content integration.

In accordance with another embodiment, there is provided a non-transitory computer-readable medium having statements and instructions stored thereon for implementation by a processor of a personal communication device in sharing digital user content via a server-based content sharing platform by: receiving as input via a graphical user interface implemented on the personal communication device, selection of the user content to be shared via the server-based content sharing platform; receiving as input via said graphical user interface, selection of an integrated external content preference selected from a plurality of such preferences; and communicating said user content selection and said integrated external content preference selection to an external content integration engine operated by a remote digital data processor to integrate a selected external content item corresponding with said preference selection with said user content to output a sharable integrated content item, with instructions to have said sharable integrated content item relayed to the server-based content sharing platform to be shared thereon on behalf of said user as originating therefrom.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

DETAILED DESCRIPTION

Figure 1:
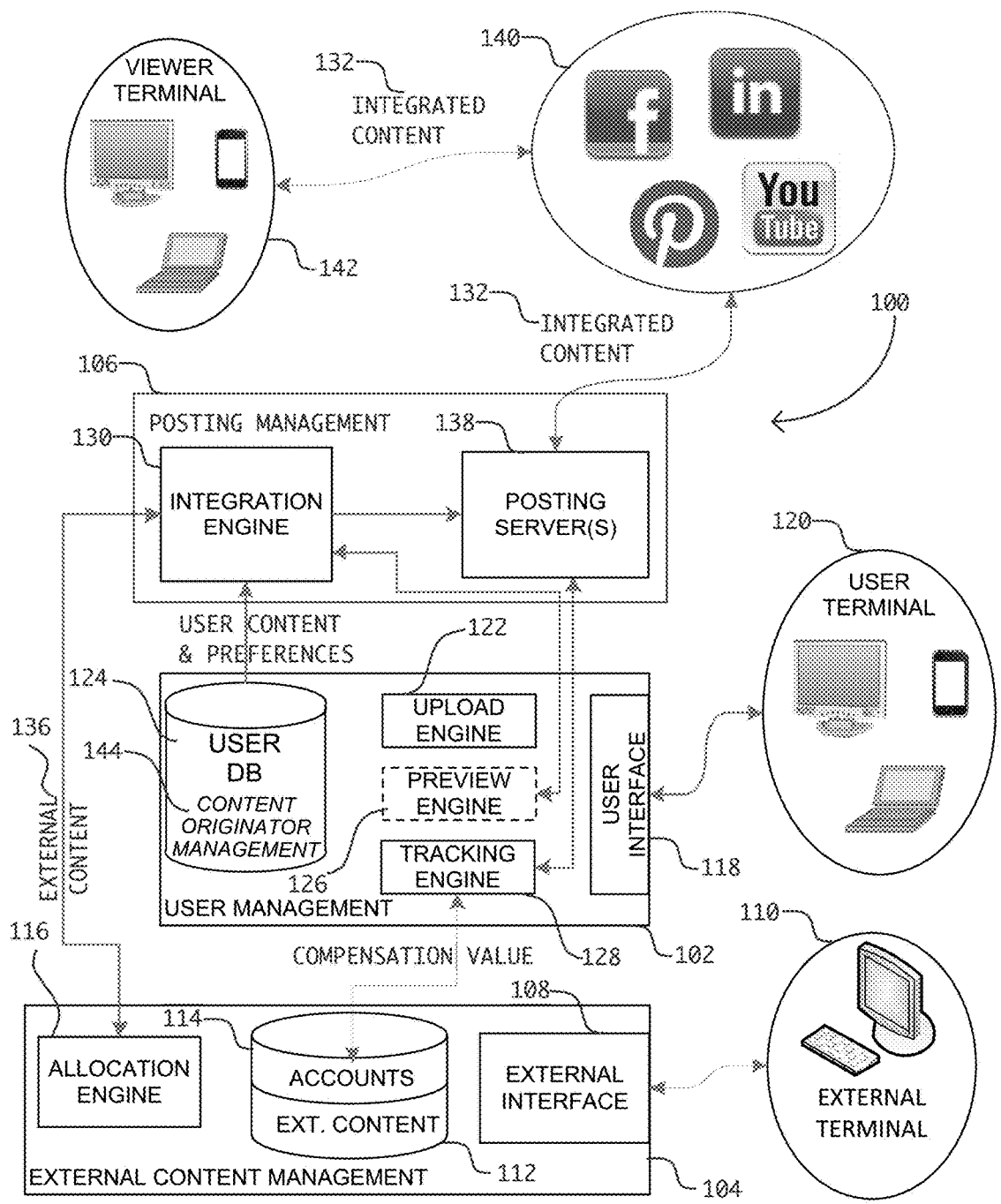
FIG. 1 is a high level diagram of a user content sharing system and method with automated external content integration, in accordance with one embodiment of the invention.

The systems and methods described herein provide, in accordance with different embodiments, different examples in which external content can be automatically integrated within user content as this content is shared over a communication network on one or more content sharing platforms. For instance, it is currently commonplace for individuals to post or share personal content (e.g. text, images, pictures, videos, etc.) via one or more sharing platforms, be they social media platforms such as Facebook™ Twitter™, Pinterest™, Instagram™, etc., online or Web-based publication platforms (e.g. publicly accessible websites, blogs, etc.), online media distribution channels or platforms (e.g. YouTube), and more traditional network communication mediums such as email, texting (short message service—SMS, multimedia message service—MMS), etc.

In accordance with some aspects of the below-described embodiments, users of such sharing platforms are provided with a means to monetize their contributions through the direct integration of external content with their posted materials, namely external materials sponsored by third party contributors seeking to gain increased public exposure through these sharing platforms. In some examples, the external content contributor will include, but is not limited to, an entity or agent submitting external content for integration with the various user content items shared by users on distinct sharing platforms through embodiments of the herein described systems and services. Accordingly, in some examples, an incremental compensation value may be tracked and calculated for each user based on the number of postings funneled through the system so to have external content materials, or other such external content, integrated therein and thus rendered visible to the user's contacts, followers, friends, etc. The compensation value may also be calculated, at least in part, as a function of the number of distinct sharing platforms selected for sharing each integrated content item. In addition to the number of integrated posts, the user may also select, in some embodiments, a level of external content to be integrated with their post (e.g. low, medium high), and have a corresponding compensation rate applied to their account accordingly.

In some aspects, the compensation value may at least in part be calculated as a function of a visibility factor associated with each post, or each user in general, for example, based on the number of contacts, followers, friends and the like, or a general reputation value associated with this user and/or a profile thereof on the selected sharing platform. Another example may rather or also include tracking of actual integrated content views, likes, forwards, and/or content item clicks to quantify a market reach provided by the integrated content post.

These and other applications will be described in greater detail below, in a non-restrictive manner, with reference to the below description of exemplary embodiments.

With reference now to FIG. 1, and in accordance with one embodiment, an example of a user content sharing system 100 will now be described. The system 100 generally comprises a user management module 102, an external content management module 104 and a posting management module 106.

The external content provider module 104 generally consists of a network accessible (e.g. server-based or Web-accessible) module having an interface 108 accessible from an external content provider terminal 110 (e.g. general purpose computer such as a desktop or laptop computer, wireless communication device such as a Web-enabled smartphone or the like, or other such devices as will be readily apparent to the skilled artisan) that allows external entities to upload and characterise external content, define target audiences (e.g. user demographics, targeted sharing platforms, etc.) and set different parameters generally associated with the establishment of a comprehensive online campaign (e.g. user compensation rates, rules and options). Generally, the external content provider may access the system 100 through the interface 108 and upload external content (e.g. still images, pictures, videos, icons, emblems, taglines, links, text, logos, etc.) and campaign parameters in an external contents database 112, and execute the transfer of funds in association therewith for tracking via a corresponding accounts database 114. Once the campaign is defined and ready to implement, an allocation engine 116 may be operated to actively select appropriate external content from the database 112, for example based on one or more user preferences, demographics or the like (discussed in greater detail below), for integration with selected user content, as discussed below. Compensation for the operator of the system 100 and its users may be drawn from the external content providers' accounts based on one or more pre-set compensation rules or the like as defined in the external content provider's campaign.

The user management module 102 also generally consists of a network accessible module having a user interface 118 allowing system users access, via a respective user terminal 120 (e.g. laptop or desktop computer, tablet, smartphone or cellular phone, smartTV, etc.), to the system's various functions and features. In some embodiments, the interface provides for dynamic interaction of the user with the system 100 via an online web application interface. The system may otherwise or also interface with users via a dedicated client application interface locally implemented by the user's terminal 120 (e.g. via a smartphone or tablet app locally stored thereon and operated therefrom). In yet other examples, the user module 102 may automatically interface with user terminals 120 via one or more common network interfaces, for instance acting as an intermediary or redirecting email server automatically interfacing with a user terminal email client, or again as a cellular network-based texting gateway automatically interfacing with a user's cellular phone texting function, to name a few.

In these and similar examples, the user interface 118 allows for user selection of contents (e.g. text, images, photos, videos, etc.) to be shared through the system, and further in some examples, for the selection of a destination sharing platform from multiple accessible platforms, and/or selection of different external content integration preferences or parameters to customize user interactions with and benefits from using the system. Illustratively, the user module 102 comprises a user content upload engine 122 for uploading user content and preferences/selections to a user database 124, an optional preview engine 126 for allowing the user to preview and confirm posting of the integrated content once generated, and a tracking engine 128 to track integrated postings and incremental benefits associated therewith, and manage compensation to be transferred from the respective external content provider accounts 114 to the user accounts accordingly. The user database 124 may also include, as discussed in greater details below with reference to an exemplary embodiment, a content originator management function 142, whereby the originator of each content element posted or shared via the system 100 is not only embedded with external content, but also embedded with an integral mark or identifier as to the content's originator and thus traceable to the originating user via the user database 124, for example.

The posting module 106 illustratively comprises an integration engine 130 for assembling the integrated content 132 to be posted from the user content and preferences 134 accessed from the user database 124, and the external content 136 accessed from the allocation engine 116. The integration engine 130 may also process integration of content originator mark or identifier, as noted above, in facilitating traceability of the original content to the original posting or sharing user. In yet other embodiments, the integration engine 130 may further or alternatively process integration of a unique scan code (e.g. QR code, bar code, serial number) that uniquely identifies the integrated content once posted and/or the content originator. In one example, the integration engine will receive as input the selected user content and user preferences associated therewith (e.g. individual content or post-specific preferences, general user-specific preferences, sharing platform-specific preferences, originating user identifier or marker, uniquely generated scan code, etc.) and communicate these preferences, or a relevant subset thereof, to the allocation engine 116 that will select appropriate external content items or elements for integration with the user's content based on those preferences. Once all relevant user and external contents are made available to the integration engine 130, it will proceed to integrate the external content with the user content (e.g. embed, adjoin, overlay, juxtapose, etc.), again optionally consistent with relevant user preferences, to be posted to one or more selected sharing platforms 140 via, in this Web-based example, a posting server 138. Clearly, where the sharing platform involves email or texting, appropriate posting/sharing engine(s) (e.g. email server or router, cellular gateway, etc.) may be included, alone or in combination, to provide the selected service. Once posted, the integrated content 132 may be viewed, and in some embodiments interacted with, via an appropriate viewer terminal 142 (e.g. smartphone or cellular phone, laptop, tablet, desktop, etc.).

In some embodiments, the system 100 may be used to concurrently provide access to different types of sharing platforms, even where different communication technologies and network architectures may be required to complete the posting of the integrated content on these communicatively distinct platforms. For instance, much like the user interface 118 may encompass distinct communication interfaces for interfacing with different communication devices and/or over different communication networks, the posting module 106 may, in some embodiments, encompass multiple posting servers, gateways or the like, in allowing for the integrated posting and effectively act as an intermediary in the communication link between the user terminal and ultimately the viewer terminal and its access to the selected network-based sharing platform.

In one exemplary embodiment where shared content includes video content, the integration engine may include an open source encoding engine/server, such as VLC (VideoLAN Organization), that merges a selected content stream with its allocated external content in generating an embedded stream for sharing. For instance, the resulting integrated content may ultimately result from the digital alteration of the original content file (e.g. digital integration of embedded content within the originating video file (MP4, MPEG4, etc.) or image file (JPEG, BMP, PNG, etc.), or again integration of the embedded content within originating file before conversion for upload to a selected sharing platform). Using this approach, the embedded stream cannot be readily separated or altered by the viewer or sharing platform, thus ensuring external contents are displayed as originally intended during the encoding process. In one such example, each encoder provides h.264 encoding over an mpeg4 carrier, thought it will be appreciated that other standards, such as mpeg2 and the like, may also be considered without departing from the general scope and nature of the present disclosure.

In some embodiments, the integration engine may be used to enhance the production value of the posted content by integrating different external content features or options, be they for the enhancement of the promotional value of the posted content, such as via a leading or trailing external video, video overlay, content frame, watermark, split screen, or other such techniques, or for the enhancement of the professional production value of the posted content, such as by adding leading or trailing credits, and/or integrating user information in a frame, banner, split screen, mosaic, or inset within the content, to name a few examples.

As will be appreciated by the skilled artisan, the integration of embedded external content within still photographs, images or text files may be achieved by the above noted method, or via other image processing techniques readily known in the art, with similar options as to external content integration levels, preferences and the like.

In these and similar examples, given that the external content is integrated or embedded with the user content, a downstream viewer may not readily alter his viewing experience to block or otherwise extract the external content, and is thus committed to viewing the external content.

Figure 10:
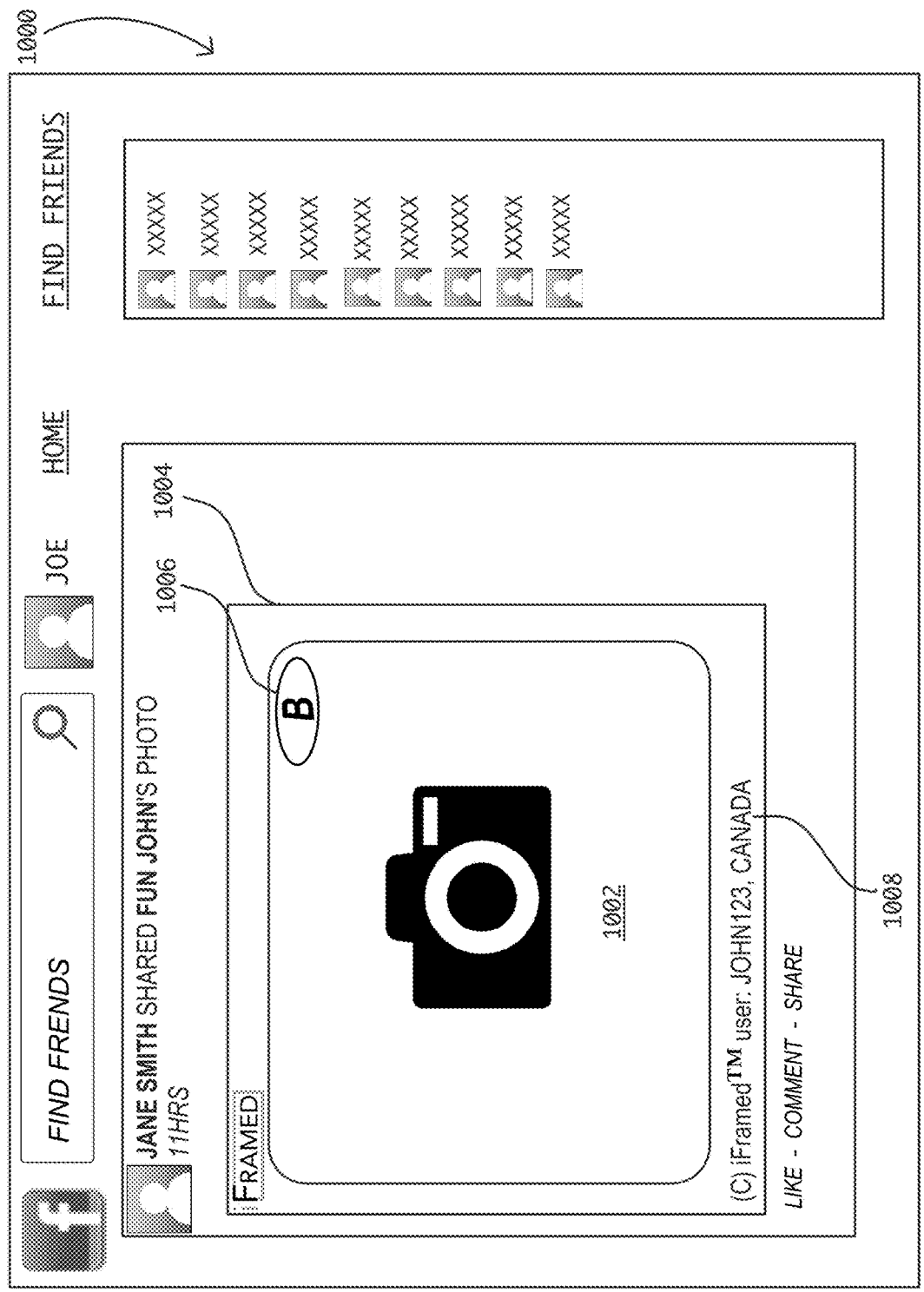
FIG. 10 is an exemplary screenshot of integrated content originally posted by a content originator on a content sharing platform page and subsequently shared by a contact of the originator on their content sharing platform page to be viewed by respective contacts thereof, wherein the content originator is integrally identified by the integrated content, in accordance with one embodiment of the invention.
Figure 11:
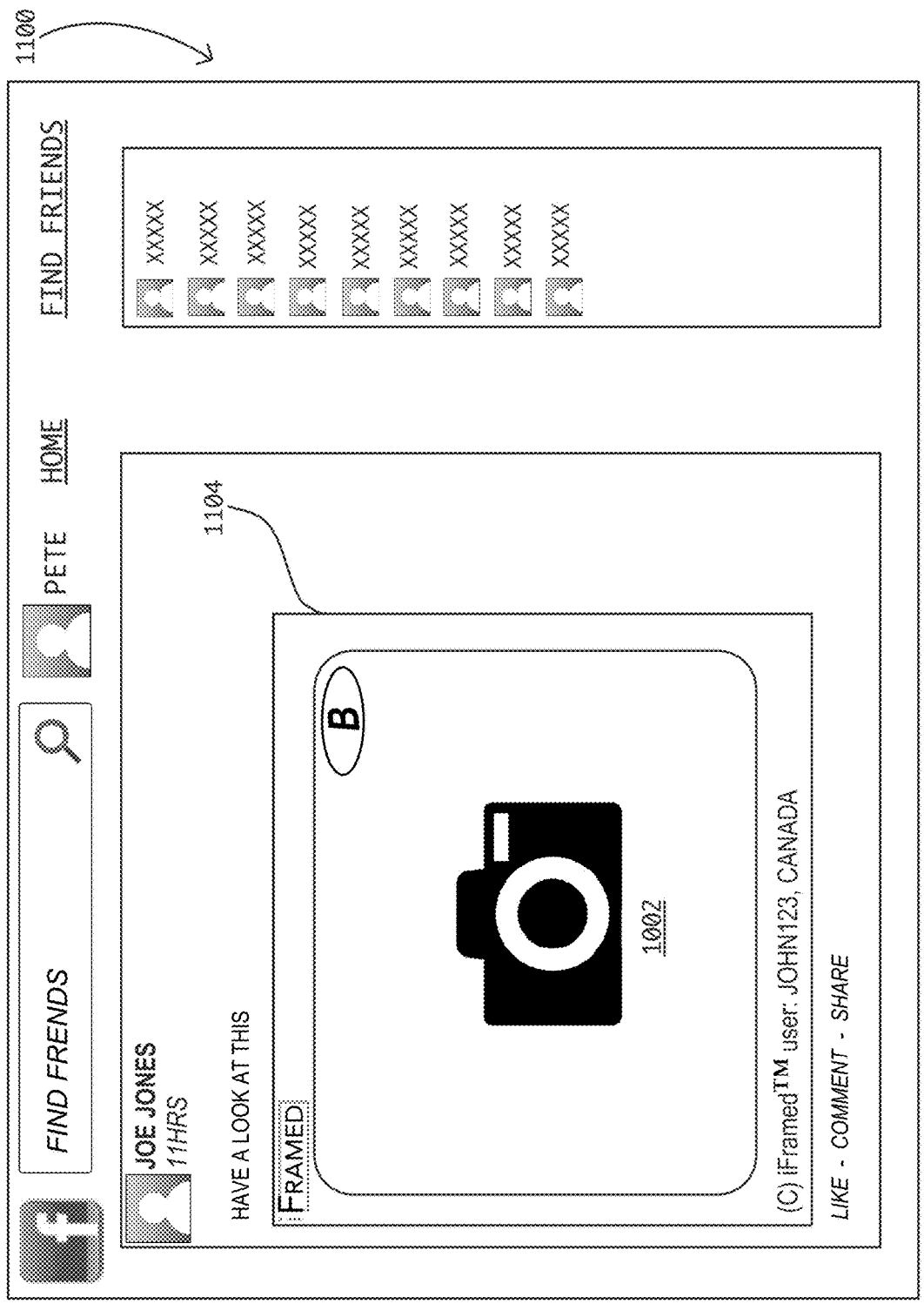
FIG. 11 is an exemplary screenshot of the integrated content of FIG. 10 once reposted by another user of the content sharing platform but without reference to the content originator by the content sharing platform, wherein the content originator is nonetheless integrally identified by the integrated content when viewed by the other user's contacts, in accordance with one embodiment of the invention.

In yet another embodiment, and as further exemplified below with reference to FIGS. 10 and 11, the integration engine may be used to embed or otherwise digitally mark posted content for the purpose of identifying the originator of this content as it is disseminated over Internet, social media and/or other such sharing platforms. For instance, integration of a watermark or digital signature to the content being posted may allow this content to integrally identify the posting source, be it through the use of an originating user alias, name, personal identification number, user-specific barcode, QR code, or the like, and that, be it visible (e.g. as shown in the example of FIGS. 10 and 11), or invisible (e.g. within the context of a digital watermark such as those common in the field of digital media antipiracy).

Figure 2:
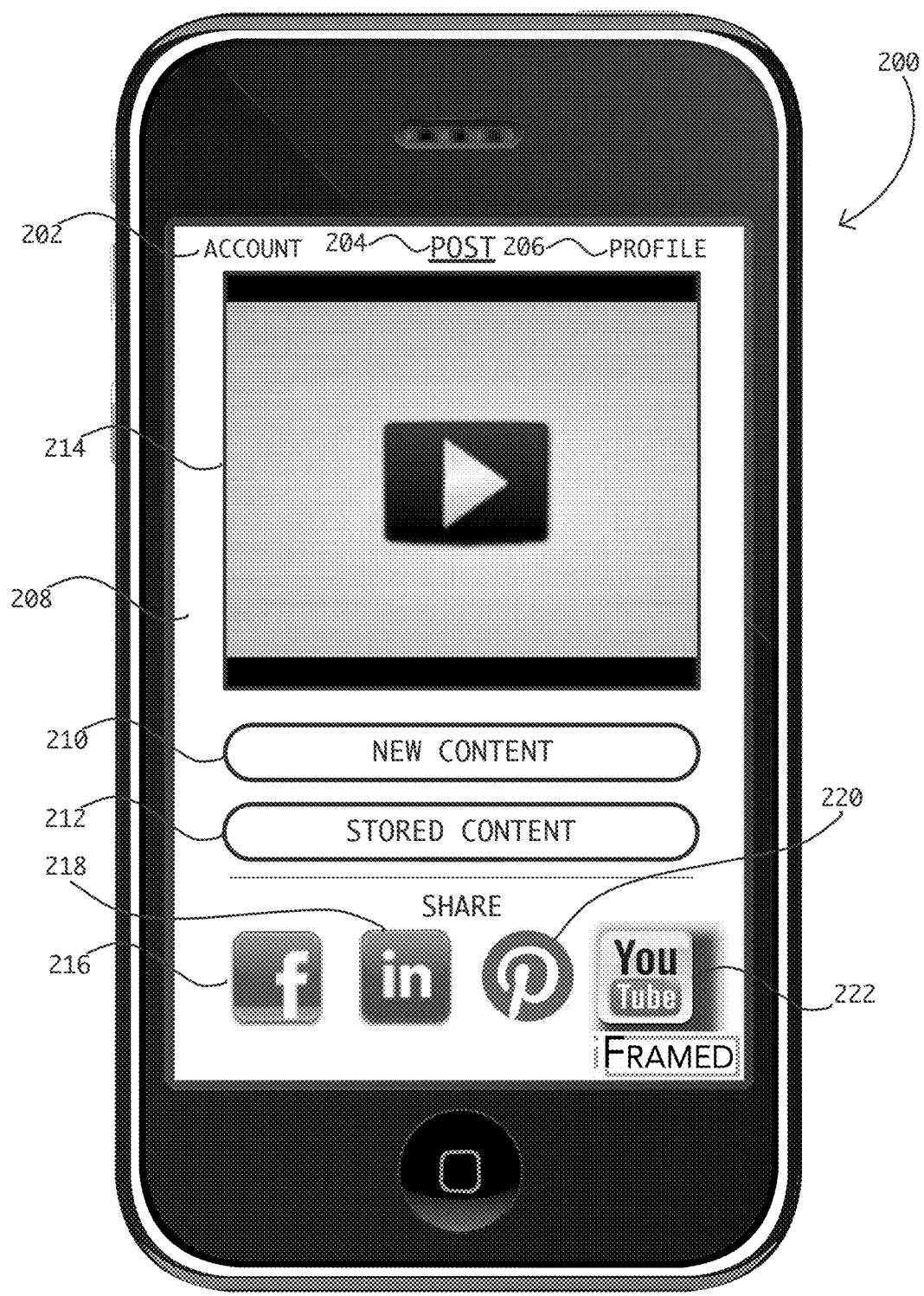
FIG. 2 is front view of an illustrative user terminal having rendered thereon a graphical user interface to be operated by a user in selecting user content for sharing and a destination sharing platform therefor, in accordance with one embodiment of the invention.

In the embodiment of FIG. 2, the user database 124 is thus further illustrated to include associated therewith a content originator function 142, whereby user profile details are not only stored and used in the identification and/or selection of appropriate external content integration, but also in the marking and tracking of each user's original content. Accordingly, while a user's post on some content sharing platforms may, in some examples, result in a relinquishment of at least some of the user's ownership/copyright in the posted content to the sharing platform operator/owner, the user may nonetheless retain some form of integral association with the content, be it for the purposes of social recognition, monetary compensation from similarly integrated external content providers, social network and/or content sharing platform recognition and/or compensation, reputation, to name a few examples. Yet using other content sharing platforms, the user may retain ownership of the posted content, for example in the context of shared content via a Multimedia Messaging Service (MMS), BlackBerry™ Messenger™ (BBM™), standard, enterprise or Web-based email, and the like. Irrespective of the extent of total or residual ownership in the posted or shared content, the originator's identity for each posted content element may remain integrally embedded within the content itself, either in visible or invisible (e.g. watermark) form, and traceable to its originating user via the system's user database 124 and associated content originator function 142. Further examples will be provided below.

Figure 9:
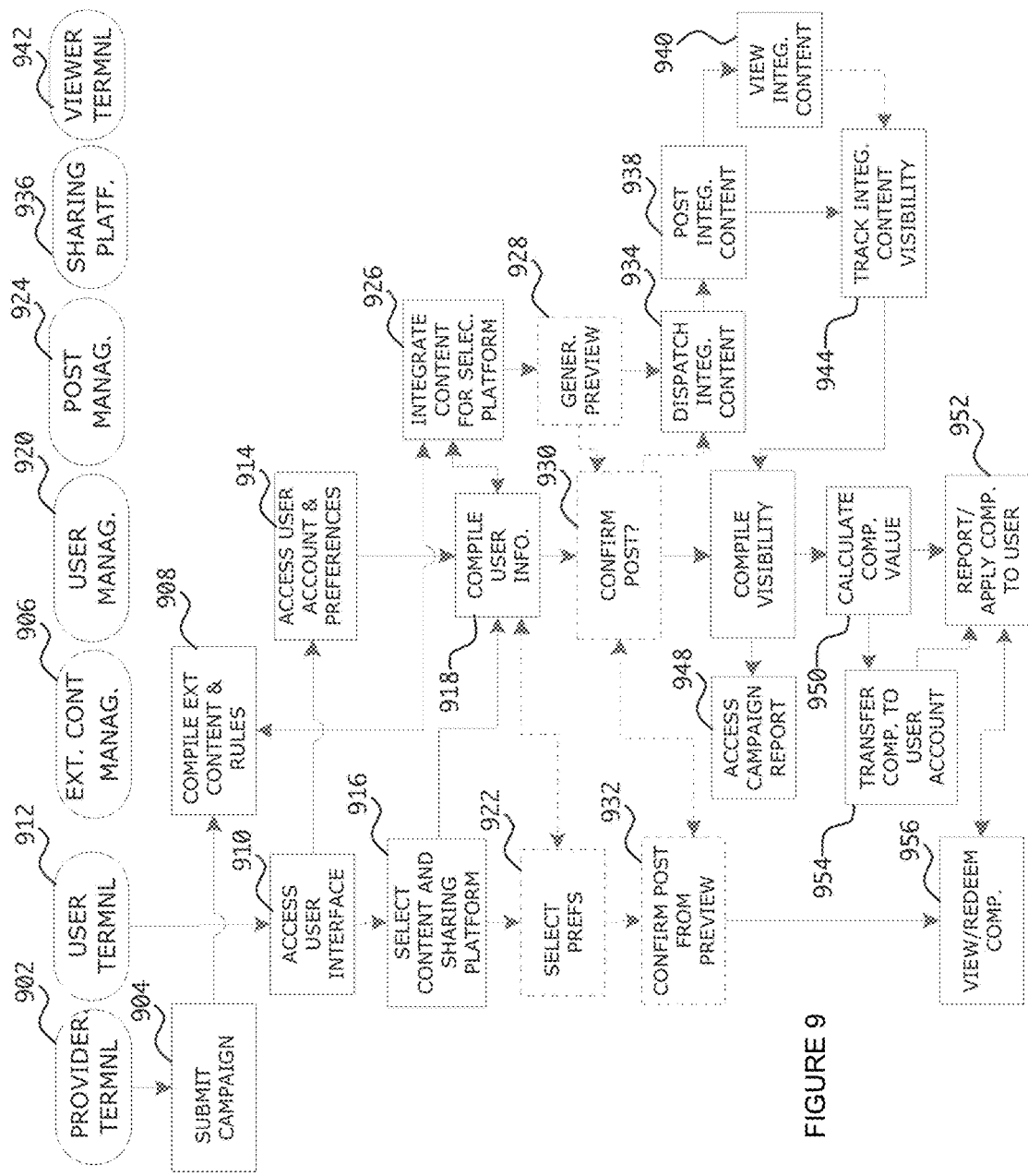
FIG. 9 is a process flowchart for a user content sharing system and method with automated external content integration, in accordance with one embodiment of the invention.

With reference now to FIG. 9, and in accordance with one embodiment of the invention, an exemplary process flow implemented within the context of the content sharing platform described above, will now be described. In this illustrative sequence, an external content provider terminal 902 is first used to submit a campaign at step 904 to an external content management system 906. While an electronic submission is considered in the example of FIG. 1, other submission techniques may be considered without departing from the general scope of the present disclosure. At step 908 the campaign is compiled to produce one or more external content items, formats, preferences and/or rules based on the submitted campaign.

In this example, at step 910, a new user accesses the system's user interface via a user terminal 912 to access and set up a new user account at step 914, for example in setting preferred or available sharing platforms to which they may wish to post content through the system (e.g. providing user credentials such as username and password, answers to security questions, access codes, account details, etc.), posting preferences (e.g. external content integration levels, preferences, etc.), account/compensation settings (e.g. coordinates where monetary compensation may be directed; accounts such as phone, internet, television accounts to which compensations may be applied, etc.), and the like. In some embodiments, the registration process may include the download of a client application to be operated from the user's device, the establishment of a link or connection between the system and an existing application on the user's device (e.g. redirection parameters to have outgoing emails, texts and the like redirected to the system under certain conditions, e.g. upon user confirmation, upon defining preset destinations, etc.) to be relayed thereby to the intended destination. Other examples may include the establishment of a web-accessible account whereby a system username and password may be established to provide the user access to the web-enabled system. Other examples may also readily apply, as will be readily appreciated.

Once the user's account has been established, the user may select user content to be shared at step 916. This may include locally or remotely stored content, or again include the dynamic activation of a content acquisition application on the user's device (e.g. camera, video recorder) to acquire and preview new content. Where a user's posting preferences have not been preset, the user may also at this step select a destination sharing platform for the selected content.

At step 918, the selected content and destination platform is compiled, along with relevant user preferences, presets and the like, by the user management system 920. Relevant information may be accessed from the user's account (e.g. where posting and/or external content preferences have been preset at step 914), the user's current selection as provided through the user terminal either at step 916, or via a separate optional external content preference selection step 922 implemented through the user interface. This user information is then communicated to the integration engine of the post management system 924, which uses this information at step 926 to query the allocation engine of the external content management system 906 and the external data available thereto as compiled at step 908. The optional user preference selection step 922 may also be initiated by the integration engine through the user interface, as can other configurations and permutations, without departing from the general scope and nature of the present disclosure.

As noted above, additional user data may also be compiled at this step, for example extracted from the user's profile stored by the user management system 920, to provide for the embedding of a digital certificate or mark of originality with the original content to be posted/shared, such as a visible or invisible mark or identifier associated with the originating user. Accordingly, once the integrated content is posted or shared, the content's originator will be integrally identifiable from the integrated content itself, and optionally traceable via the system's user database 124, for example (e.g. via name recognition, a uniquely defined scan code such as a QR code or serial number, and the like).

In one embodiment, an integrated content preview may be generated at step 928 and communicated through the user interface at step 930 to the user terminal 932 for confirmation. Once confirmed, or where integration is preapproved by default, the integrated content is dispatched by the posting server/engine/gateway at step 934, and posted by the sharing platform 936 at step 938. The integrated content can then be viewed, accessed and/or interacted with at step 940 via an appropriate viewer terminal 942.

At step 944, the integrated content visibility is tracked, for example via the posting server or another agent operable to monitor the direct distribution of the integrated content, or again via monitoring of actual integrated content views and/or access (e.g. recorded content likes, forwards, comments, etc.) and communicated to the user management system 920 where it is compiled against the user's account at step 946, and reported to the external content provider at step 948 through external content provider system 906. The visibility is then processed against one or more compensation rules at step 950 and reported in the user's account at step 952 and in the corresponding external content provider's account at step 954, in response to which a corresponding compensation credit is concurrently transferred to the user's account. The user may then view and/or redeem the compensation using the user terminal 912 at step 956.

As will be appreciated by the skilled artisan, the above-described process is provided as an example only, and may be altered in different manners to achieve similar results. Further, while elements of this illustrative process have been linked with the exemplary system architecture of FIG. 1, other system components may be utilized to execute a similar process, as can certain process steps be implemented by different components in a local, shared or distributed manner.

With reference now to FIGS. 2 to 7, an illustrative graphical user interface 200 will now be described within the context of a smartphone application operated to provide user access to the content sharing and integration system described above. In FIG. 2, the user interface 200 provides three selectable functions, that is an accounts function 202 for creating, accessing and/or updating user account information, a posting function 204 for taking the user through a user content integration and posting process, and a profile function 206 for creating, accessing and/or updating user profile information, for example in respect of different destination sharing platforms accessible to the user through the system. In the illustrated mode selection, the user interface renders a first posting process interface screen 208.

In particular, this screen 208 provides the user with functional touch-sensitive buttons to first select one of 'new content' 210 and 'stored content' 212 to be posted. Selection of the former may, in one example, invoke a camera or video recorder function of the device, either in a separate screen (i.e. standard device application function) or through a preview window 214. Other options may also include, but are not limited to, new text entered through a functional text box, a web link or the like, and other such contributions. Selection of the 'stored content' button 212 on the other hand may allow the user to search through user content stored on the device to be posted, such as previously captured images or videos, text files, emails, blogs, posts, etc. In yet another example not explicitly illustrated herein, the posting application interface may also be rendered accessible through or on other application interfaces of the device, for example as a sharing or posting option. For example, a third-party smartphone camera application may provide the user the ability to share captured images and/or video directly through one or more user accounts (e.g. email, text, BBM™, etc.), and may, in some embodiments, also provide the option to directly share such contents through the content sharing system described herein. For instance, the camera function may provide a selectable option to share the recently captured or stored content through the herein-described sharing system via a corresponding selectable icon, symbol or named option, which, upon selection, automatically opens the posting interface screen 208 and imports the selected content into the preview window 214. Other content selection may also be considered, as will be appreciated by the skilled artisan, without departing from the general scope and nature of the present disclosure.

Upon the user content having been selected and posted in the preview window 214, the user may select one or more of multiple available sharing platforms, such as for example, via the selectable Facebook™ functional icon 216. The identified platforms may either correspond to platforms with which the user has already registered an account, or again a listing of supported platforms with which the user may wish to create a new account or against which the user may wish to identify existing credentials. In this particular example, the user has already registered a profile with Facebook™ LinkedIn™, Pinterest™ and YouTube™, and these platforms are thus made available for selection by the user at this step via selectable functional icons 216, 218, 220 and 222, respectively. In this particular example, the selected content consists of a video to be posted via YouTube™, as indicated by the selected YouTube™ icon 222.

Figure 3:
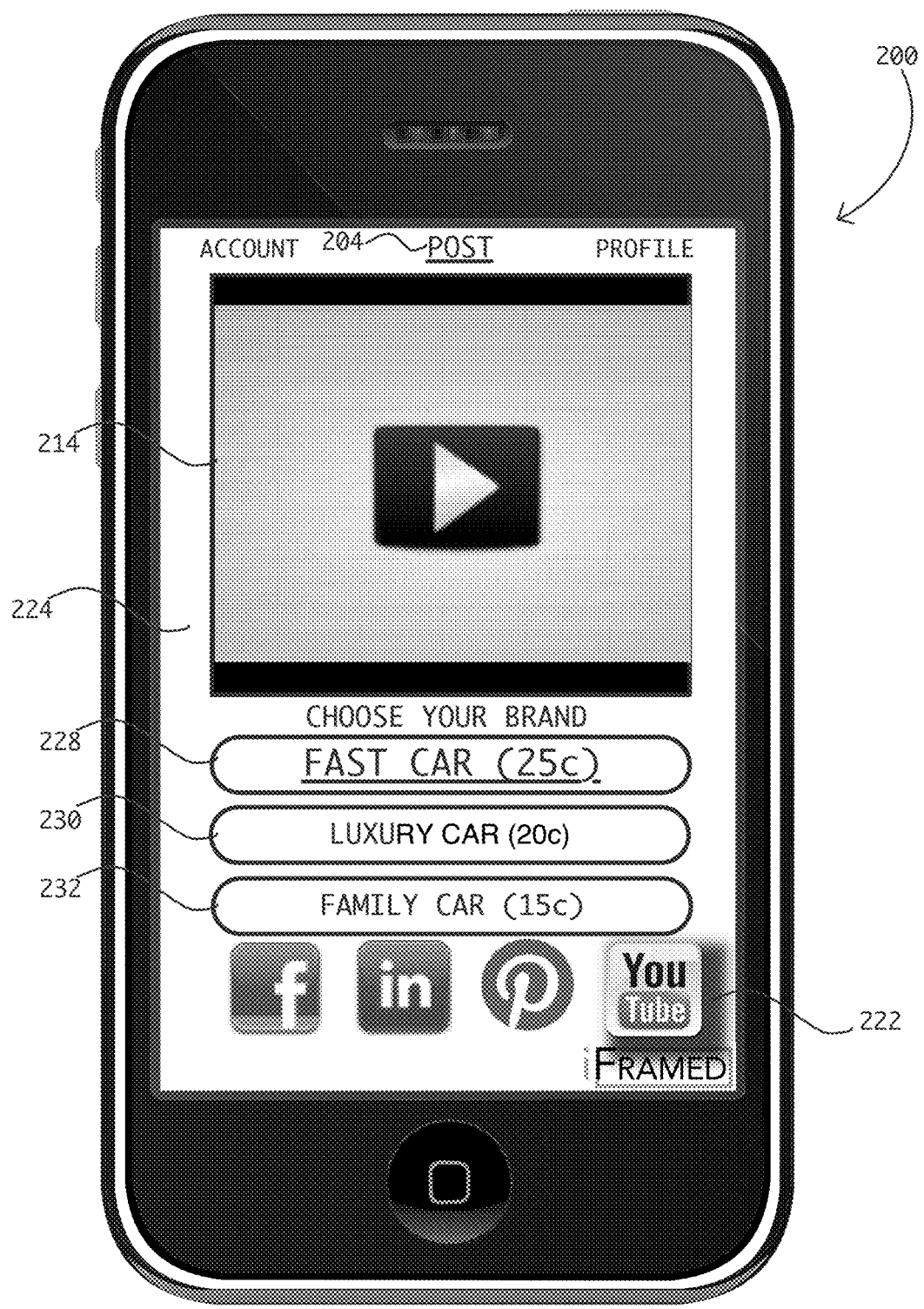
FIG. 3 is a front view of the illustrative user terminal of FIG. 2, having rendered thereon a graphical user interface to be operated by the user in selecting a branding type preference for consideration in selecting an external content item to be integrated within the selected user content when posted on the selected destination sharing platform, in accordance with one embodiment of the invention.

With reference to FIG. 3, upon the user content and destination sharing platform having been selected via interface screen 208, the application proceeds to render a subsequent posting screen 224 in which the selected content is again shown in the preview window 214 and where the selected sharing platform is again shown as selected icon 226. On this rendered screen 224, the user is provided the option to select a brand or brand type to be associated with the selected content, in this example consisting of selectable touch-sensitive 'fast car', 'luxury car' and 'family car' buttons 228, 230 and 232, respectively. A respective compensation rate is also listed against each selectable option, both as an incentive for users to select the most profitable brand, but also for external content providers to compete for sponsorship by increasing their rates. In the illustrated embodiment, the user may expect to receive the quoted compensation for each post and for each of the selected sharing platforms (i.e. the same rate multiplied by the number of sharing platforms selected for that particular post and brand). In other embodiments, different rates may be applied for different sharing platforms, and totaled for a given post on multiple platforms. In this example, the user activates the 'fast car' button 228 and is carried to the next posting screen 234, as shown in FIG. 4.

Figure 4:
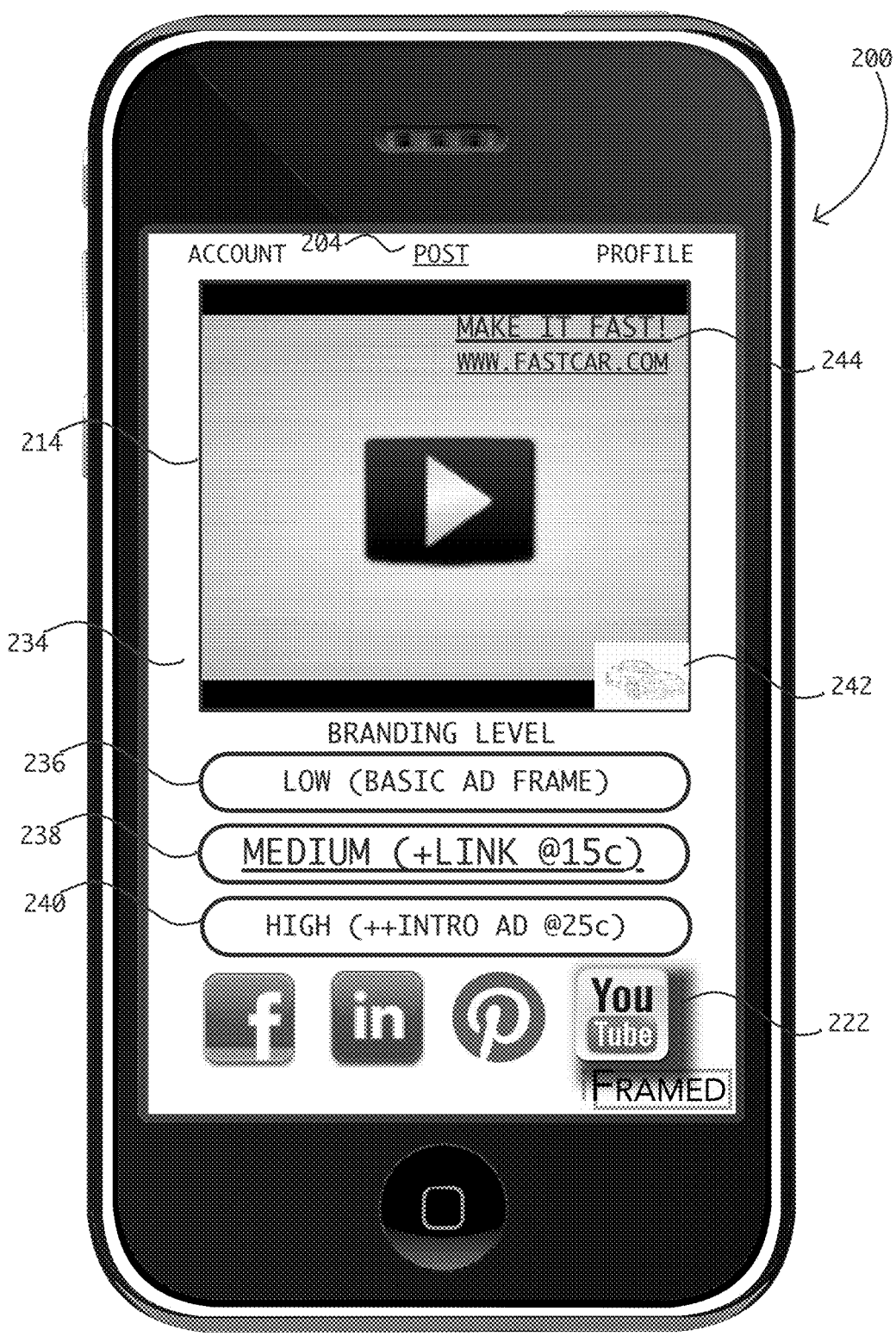
FIG. 4 is a front view of the illustrative user terminal of FIG. 2, having rendered thereon a graphical user interface to be operated by the user in selecting a branding level preference defining a level of advertising to be integrated within the selected user content when posted on the selected destination sharing platform, in accordance with one embodiment of the invention.

With reference to FIG. 4, and in accordance with one illustrative embodiment, the user is provided with the option of selecting from three branding levels for the selected brand, namely via touch-sensitive functional buttons 236, 238 and 240 for low, medium and high branding levels respectively. With these options, the user is also provided with respective added compensation values to be associated with their personal account in response to selecting either of the enhanced branding level options (e.g. an added 15 cents/post or 25 cents/post in exchange for cumulatively integrating a corresponding link and intro content item, respectively, beyond the basic external content frame).

In some embodiments, discussed in greater detail below, the user may also have the opportunity to increase their compensation rates by improving their user profile. For example, user's having a relatively light profile (e.g. name, address) may have access to a fraction of the available posting compensation rate (e.g. 25%) as compared to users with relatively complete profiles (50%) and complete profiles (100%—gold members). In some examples, the users may be invited to enhance their profiles during the posting process as an incentive to accessing higher payouts. This increasing compensation may, for example, be provided as an incentive for users to complete their profile, which in turn, may generate greater interest from external content providers who wish to know more about their target audience. In some embodiments, a completeness of the user's profiles on selectable sharing platforms may also be taken into account where sharing platform profile information may be funneled back to the external content providers in the form of campaign reports, and the like.

Continuing with the example of FIG. 4, upon making a selection, the preview screen 214 is updated to show not only the selected user content but also indication of the selected external content and a level selected therefor (e.g. fast car icon 242 and link 244 for a medium-level integration selection). In one embodiment, the preview screen 214 may rather show a preview of the now fully integrated content, as discussed above with respect to process steps 928 to 932 of FIG. 9. Once satisfied the user may again be directed to select the destination sharing platform icon 222 (e.g. it may flash or blink as an indication that action is required), at which point, the integrated content is posted to the destination platform on behalf of the user as originating therefrom.

Figure 8:
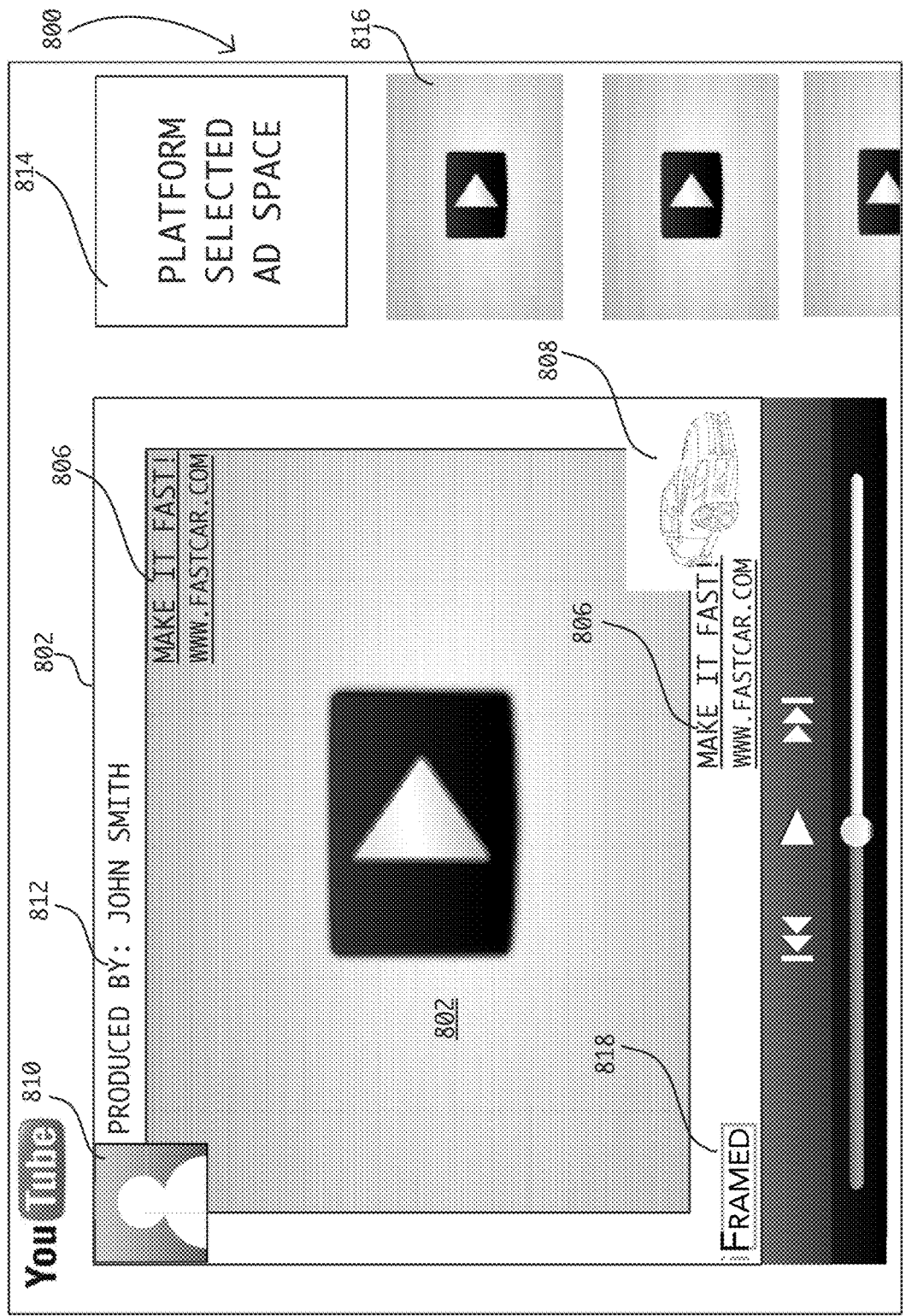
FIG. 8 is an exemplary screenshot of integrated content as posted on a video sharing platform, in accordance with one embodiment of the invention.

An example of the posted shared content is shown at FIG. 8, in which a screen shot 800 of the sharing platform as seen via a viewer terminal is shown to display the user content 802 framed by an external content frame 804 sponsored by the user-selected brand or brand type. Given the selected branding level discussed with reference to FIG. 4, the integrated content further includes one or more dynamic links 806 to the external content provider, and a branded icon 808. Production notes, such as a profile picture of the user 810 and a 'produced by' caption 812 are also provided to enhance a production value of the user's content contribution. In this example, an icon 818 representative of the content integration and sharing system used by the user to post the content is also provided. Other standard platform features, such as platform selected external content item 814 and related contents 816 may also be included without direct user input, control and/or influence.

Figure 5:
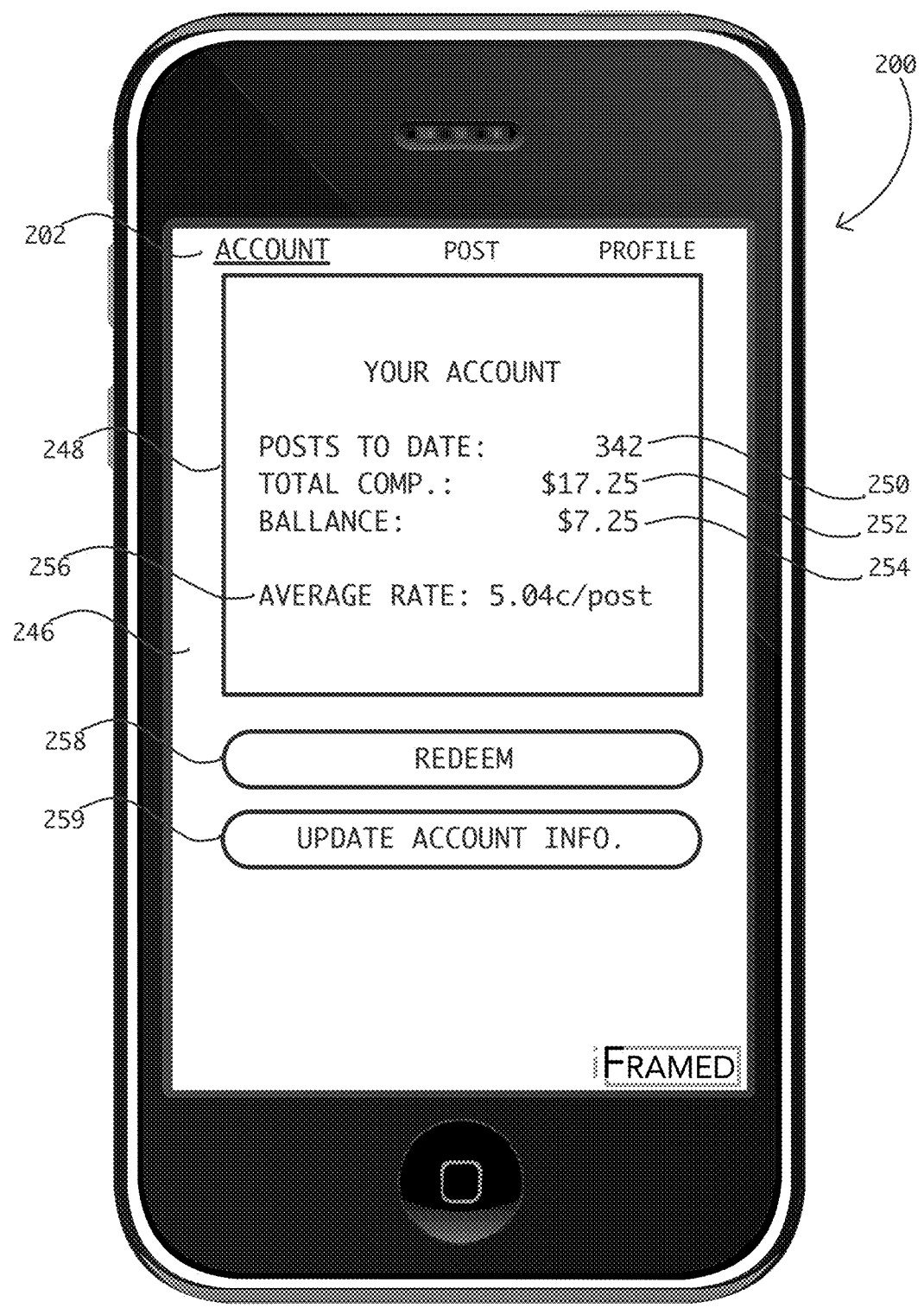
FIG. 5 is a front view of the illustrative user terminal of FIG. 2, having rendered thereon a graphical user interface to be operated by the user in managing a user account and a cumulated compensation value tracked thereby, in accordance with one embodiment of the invention.

With reference now to FIG. 5, and in accordance with one embodiment, the user interface 200 may also, as noted above, provide the user access to a personal account with the content integration and sharing system. For instance, upon selecting the accounts function 202, the interface may be operated to render an accounts page 246 that displays a user account window 248 in which different user account-related data may be presented (e.g. posts to date 250 using the interface or system, total compensation earned 252 using the system, a redeemable balance left in the account 254, and an average compensation rate overall 256, to name a few examples). The screen 246 may also provide selectable options to redeem all or part of the account balance via touch sensitive button 258 (e.g. have a balance applied to a preset account such as a cellphone account, internet service provider account, television broadcasting account, etc., or again transferred directly to a bank account or via cheque or the like), and/or to update account information via touch sensitive button 259 (e.g. via a distinct account update page or the like—not shown).

Figure 6:
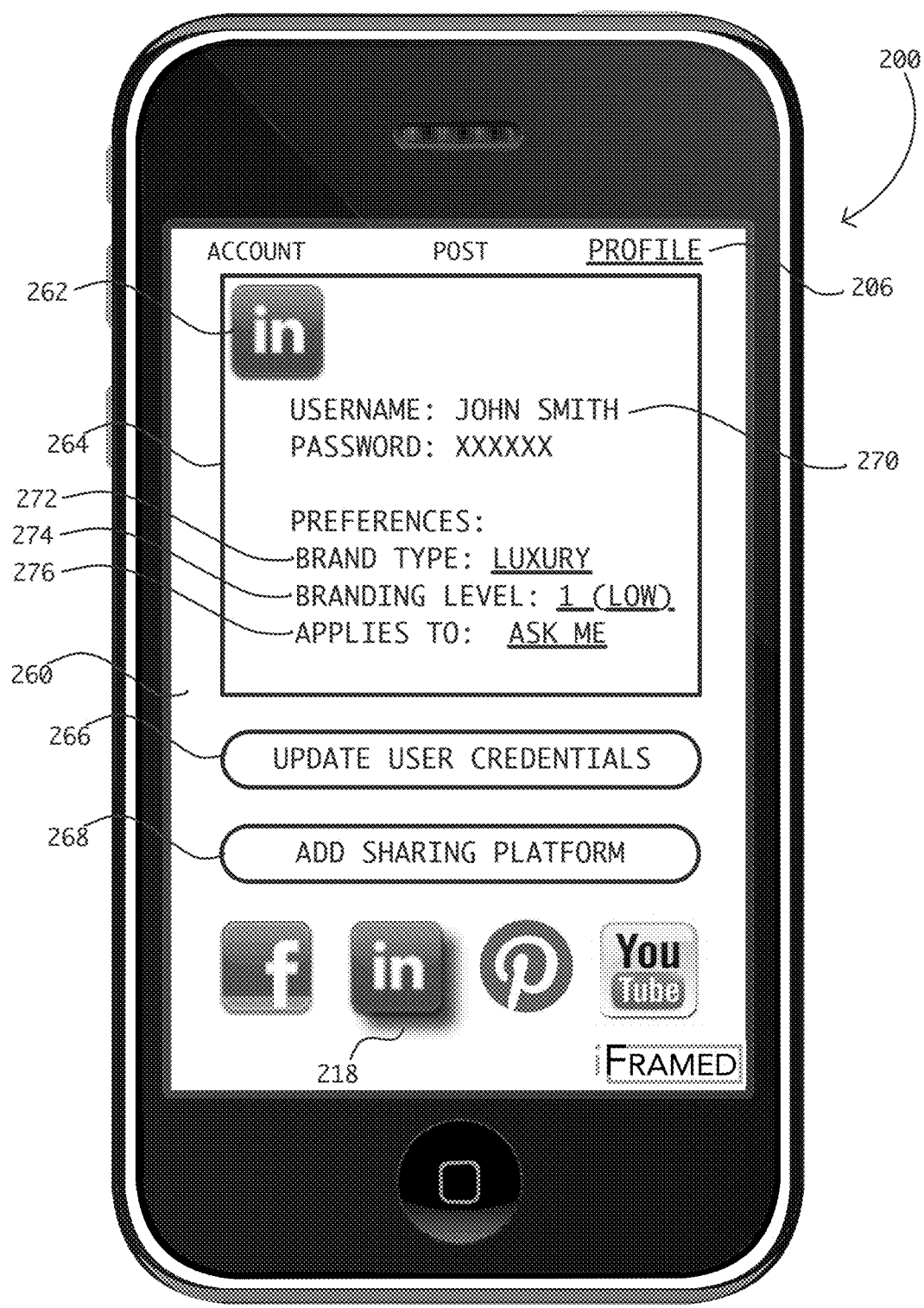
FIG. 6 is a front view of the illustrative user terminal of FIG. 2, having rendered thereon a graphical user interface to be operated by the user in managing a profile thereof associated with a given sharing platform, in accordance with one embodiment of the invention.

With reference now to FIG. 6, and in accordance with one embodiment, the user interface 200 may also, as noted above, provide the user access to different preset sharing platform profiles via selectable option 206, which, upon selection by the user, may direct the interface to one or more available profile pages, such as page 260. To view page 260 in the present example, the user selects the profile function 206 as well as the touch-selectable icon 218 of the sharing platform of interest. In response, the interface opens page 260 which is directed to the user's profile for the selected platform, as indicated by the corresponding static platform icon 262, and which displays a user profile data window 264, as well as a touch-sensitive button 266 to update selected profile credentials/parameters, and a touch-sensitive button 268 to have the user add another profile. In this example, the displayed and updatable profile includes a username and password 270 of the user for this sharing platform (e.g. usable in enabling the sharing and integration system to post content on the user's behalf, and optionally track a visibility thereof once posted), as well as different preset posting preferences such as a preferred brand type 272 (showing a preference for luxury brands over other selectable types such as family, entertainment, local, dining, etc., to name a few examples), a preferred branding level for this sharing platform 274 (showing a low level selection) and a condition for applying these preferences 276 (showing a preference that the user be asked to confirm before posting).

Figure 7:
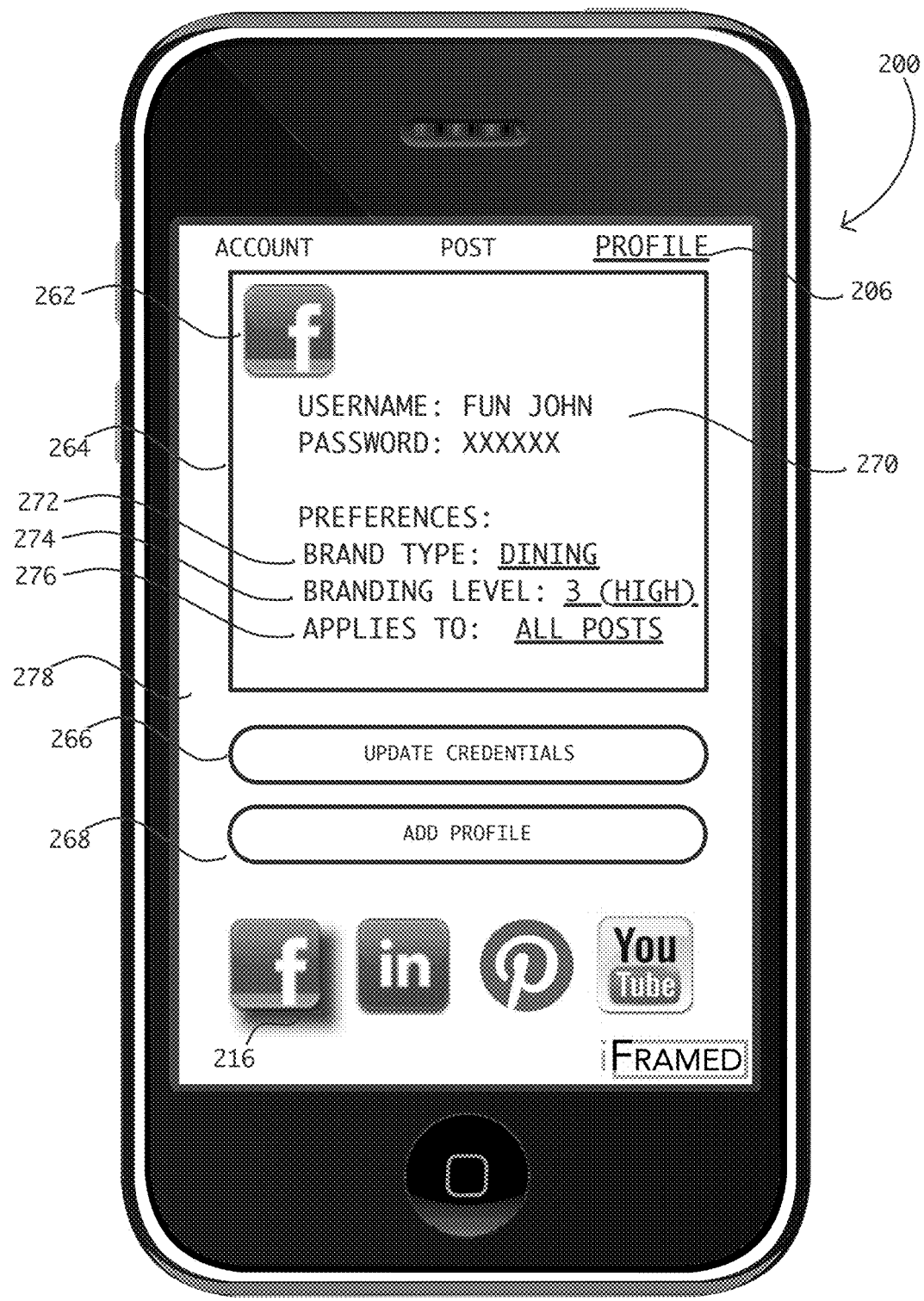
FIG. 7 is a front view of the illustrative user terminal of FIG. 2, having rendered thereon a graphical user interface to be operated by the user in managing a profile thereof associated with another given sharing platform, in accordance with one embodiment of the invention.

With reference now to FIG. 7, the user has illustratively selected the profile function 206 as well as the touch-selectable icon 216 of another sharing platform of interest. In response, the interface opens page 278 which is directed to the user's profile for the selected platform, as indicated by the corresponding static platform icon 262, and which again displays a user profile data window 264, as well as a touch-sensitive button 266 to update selected profile credentials/parameters, and a touch-sensitive button 268 to have the user add another profile. In this example, the displayed and updatable profile again includes a username and password 270 of the user for this sharing platform (e.g. usable in enabling the sharing and integration system to post content on the user's behalf, and optionally track a visibility thereof once posted), as well as different preset posting preferences such as a preferred brand type 272 (showing a preference for dining brands over other selectable types), a preferred branding level for this sharing platform 274 (showing a high level selection) and a condition for applying these preferences 276 (showing a preference that these settings be automatically applied to all new posts).

Accordingly, as shown by the above-described examples, the user may not only benefit from external revenue generated by virtue of his postings on selected sharing platforms of his choice, but also play a part in the customization of the brands applied to his posts, be it in selecting which brand or brand type is to be applied for each post on all or selected sharing platforms, or for a subset thereof under his control or influence. Further, different levels of branding can be selected for different platforms, either as a preset preference or on a case-by-case basis so to further customize the amount and type of branding a user is willing to have associated with their profiles on different platforms.

For example, a user may wish to heavily sponsor fun and energetic branding types on a personal profile like Facebook™, but chose a more conservative or luxurious branding for a professional profile, thus reducing a visual impact of the external content on his professional profile where it may be less appreciated, while promoting an air of elegance and success. Similarly, different social profiles may best be associated with different brands depending on the personal contacts associated with each profile. For example, branding selections for an online dating platform may be used to expand a user's personal profile in exhibiting preferences, hobbies or activities they are more likely to enjoy or have in common (e.g. promoting travel or sports equipment vs. local restaurants and theatres). Ultimately, user interactivity and influence on the branding to be associated with their posts not only allows these users to gain financial or other benefits from such integrated posts, but also seek to personalize their profiles and how contacts and friends perceive them.

In some embodiments, the system may further be configured to allow for selection of locally sourced external content as opposed to a more national or regional sourcing. For instance, as each user's location and demographics can be accessed from the system, micro-targeted campaigns may be facilitated and encouraged by local users and, to some extent, used thereby to show patronage or support for local enterprises. The geography of a user's contacts may also be taken into account, for example, where a user's contacts are predominantly based in another geographic area.

In some embodiments, the content integration and sharing platform may be provided, hosted or associated with the user's own communication service provider, for example a cellular voice and data service provider, home internet and phone provider, email service provider, and the like. In such embodiments, the service provider can with greater ease access and redirect posted contents for integration already forming integral part of the user's communication network. Furthermore, accrued benefits by the user may be automatically applied to the user's service in reducing applicable service fees and the like. In such context, the user's personal account information may become of greater value to potential external content providers than what may otherwise be available through standard online marketing campaigns, where online user profile data is often skewed, embellished and/or invented for the sake of presenting a different persona. By associating the content integration and sharing platform with a user's personal communication service provider, real data becomes available to campaigns and may thus allow for greater targeting capabilities and more accurate results.

With reference to FIGS. 10 and 11, and in accordance with another embodiment, an example is provided in which the content originator's identity is further embedded within the integrated content to be posted. As noted above, this feature may, in some embodiments, allow for content ownership tracking where, for example, the sharing platform allows for a user to retain ownership of and/or copyright over the shared material. In the illustrated example of FIGS. 10 and 11 where Facebook™ is selected as the content sharing platform, the posted content will still adhere to Facebook user terms and conditions as it relates to ownership and copyright, but will nonetheless preserve the ability to integrally identify the content originator.

In this particular example, and with reference to FIG. 10, the user from the previous example, JOHN SMITH also maintains a Facebook™ account under the username FUN JOHN, as shown by the exemplary profile of FIG. 7. In this particular snapshot, FUN JOHN's Facebook™ friend, JANE SMITH, has selected to share with her Facebook™ friends, which includes JOE as seen on JOE's page 1000, one of FUN JOHN's posted pictures 1002. Accordingly, JOE's page shows on a recent post 1004 that includes JOHN's picture 1002, that JANE SMITH has shared this picture 1002 as one of FUN JOHN's pictures. Since JOHN originally posted this picture using an automated external content integration and sharing method and system as described herein, the picture 1002 has embedded therein a selected external branding component or icon 1006, in this example for local restaurant brand "B" in accordance with JOHN SMITH's branding preference for this particular sharing platform (i.e. see profile brand type 272 of FIG. 7). The posted picture 1002 also has integrated therein a content originator identifier 1008, in this example consisting of "©iFramed™ user: JOHN123, CANADA", namely identifying both the source posting application "iFramed" and the username or alias used by the content originator with this application. Accordingly, upon JANE SMITH sharing FUN JOHN's picture with her Facebook™ friends, the shared picture file itself integrally digitally identifies the content originator as iFramed user JOHN123 of Canada. Those friends such as JOE with whom JOHN's picture has now been shared now invariably have access to at least an indication of the content's originator, which could be tracked directly back to the content integration application or service provider used by the content originator in marking his content. In the example of FIG. 10, this marking is duplicated, to some extent, by the credits automatically inserted in JANE's post by the Facebook™ platform in that JANE shared FUN JOHN's picture.

However, and with reference to FIG. 11, should the user instead have downloaded the picture 1002 from Facebook™ to then attempt to post it as their own, as was illustratively attempted by Facebook™ user JOE JONES upon receiving a copy of the picture 1002 from JANE's post, the embedded digital signature remains with the picture 1002. Accordingly, while JOE JONES may repost the picture as his own, or again post it on another sharing platform that does not track the original source of the shared content, JOE's reposting, as seen as an original post 1104 on JOE's Facebook™ friend PETE's page 1100, the integrated content picture 1002 will still show the content's originator as ©iFramed™ user JOHN123 of Canada. Accordingly, PETE may, at his discretion, seek out JOHN123 of Canada through the content integration service provider to identify the content's true originator. This may not only serve, in this example, as a means for tracking originality, but also, in some embodiments, in tracking appropriate compensation for the visibility to the embedded brand induced by the originator's posting.

While the above considers a Facebook™ example, similar considerations may be brought to other platforms, such as for example, Twitter™, where a user's post may be appropriately retweeted to convey proper credit to the content originator, but could otherwise be tweeted as original content by another user without proper credit to the content originator if not for the embedded digital originator signature contemplated within the context of the herein described embodiments.

Other considerations may arise when original content is posted or shared from one platform to another. For example, while retweeting an originator's content will credit the originator by virtue of Twitter's own platform implementation, one may choose to share the posted content on another platform, such as Facebook™ or the like, and in some instances, purposely or inadvertently conceal the true content originator. For example, a user could locally save an image posted by someone else on Twitter™, and then repost that image on their Facebook™ or LinkedIn™ accounts without due credit to the content originator. However, using the methods and systems described above, reference to the content originator would nonetheless appear embedded within the content, as would the embedded brand, thereby not only providing proper credit to the originator, but further expanding the branding effort. This may further act as a deterrent for those intent on taking credit for other people's content, as further effort would be required to digitally alter the content file to remove the otherwise embedded branding and originator identification.

While the above examples provide a sample embedded digital signature format, other formats may also be considered without departing from the general scope and nature of the present disclosure. For example, JOHN123 could be replaced by the originator's full name, JOHN SMITH, or again by another alias or nickname stored and maintained by the system's user database. Likewise, identifying the country of the originator may provide value in not only identifying the actual content originator but also in sharing some notion as to where the content originated from. Accordingly, different levels of disclosure may be included, in some embodiments, selectively by the user, to define their location.

Figure 12:
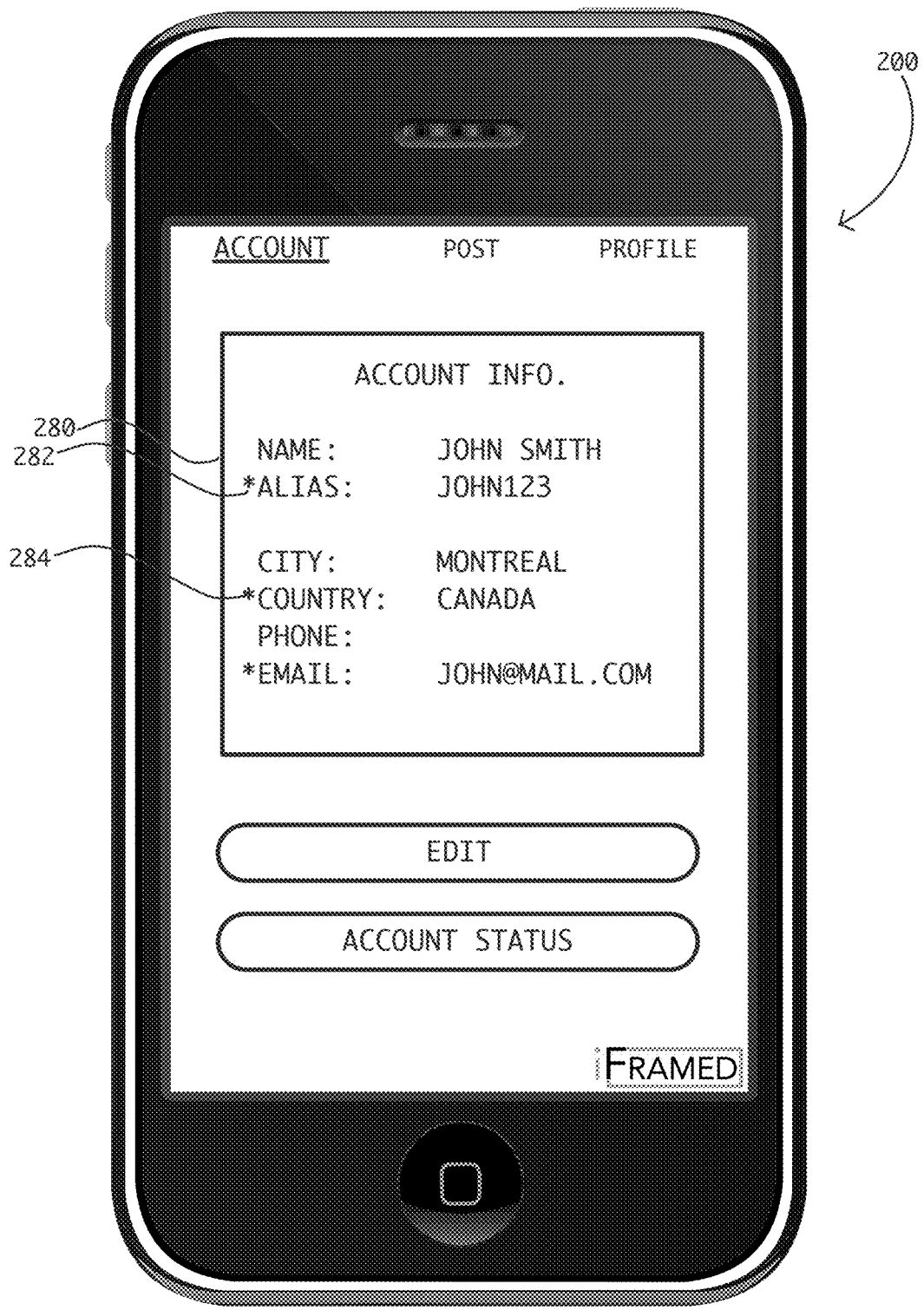
FIG. 12 is a front view of the illustrative user terminal of FIG. 2, having rendered thereon a graphical user interface to be operated by the user in managing account information thereon usable in integrating identification of the user on posted content, in accordance with one embodiment of the invention.

FIG. 12 provides an exemplary screenshot of the user interface 200 in which user account information 280 may be entered and/or edited for later use in integrating reference to the user in contents shared thereby via the system's interface. In this particular example, the user is requested to provide, at a minimum, an Alias 282 and country 284 to be used in formulating an originator identification to be posted integrally with each posted user content item (e.g. see FIGS. 10 and 11).

Below is another exemplary implementation of the above-described systems and methods, in accordance with another embodiment of the invention, illustratively described with reference to FIGS. 13 to 16.

In this example, the user content integration and sharing system allows subscribed users the ability to publish pictures and videos adorned with external content onto different social networks and receive credits or compensation for doing so. These credits may then be applied to reduce bills from their current service providers such as cable, telephone, cell phone, or Internet service providers. This may be particularly convenient where the content integration and sharing system is implemented directly or indirectly by, or in association with, such service providers. In one example, the amount of credits applied to the users' accounts may depend on the amount external content providers are willing to pay.

In order to access the posting services provided by this system, and in accordance with one embodiment, the user will signup to the service using either a dedicated mobile app (e.g. iOS7 and up, or Android 4.0 and up) or Website. In one illustrative implementation, the signup process may request that the user input their name (e.g. first and last name), their email address, a chosen username (i.e. alias) and password (e.g. entered twice for verification).

Once this information is entered and verified, various other information may be required or requested (e.g. as mandatory or optional depending on the implementation). For example, in one embodiment where credits can be automatically applied against a user's telecommunication service provider account, the user may be invited to provide the name and account number associated with the service provider account of choice. The system may also allow the user to enter, add, remove or update any such account information over time.

The user may then be provided with the option of completing a user profile to customize use of the system. For example, they may be invited to provide any of the following information, such as, Age; Male/Female; Relationship Status; Location (City, Province/State); Personal Preferences/Interests (e.g. Restaurants, Cars, Foods, Websites, Sports Teams, Athletes, Sports, Clothing, etc.)

In one example, the more comprehensive the user profile becomes (e.g. by populating more data fields), the higher compensation level may be attributed to the user (e.g. by populating at least 4 fields, or populating those fields deemed of higher relative value). This may both provide encouragement for users to provide more information and thus increase the relevance of external content later proposed or automatically associated with their posts, but also allow for greater data mining in identifying potential content providers, promoting services thereto, etc.

Once the user's account has been setup, the user may proceed to use the posting (publication) service. Below is an exemplary implementation sequence, described in accordance with one embodiment, in which an app interface 1300 is used by the user to publish integrated content (e.g. images, video) via one or more social network platforms.

Figure 13:
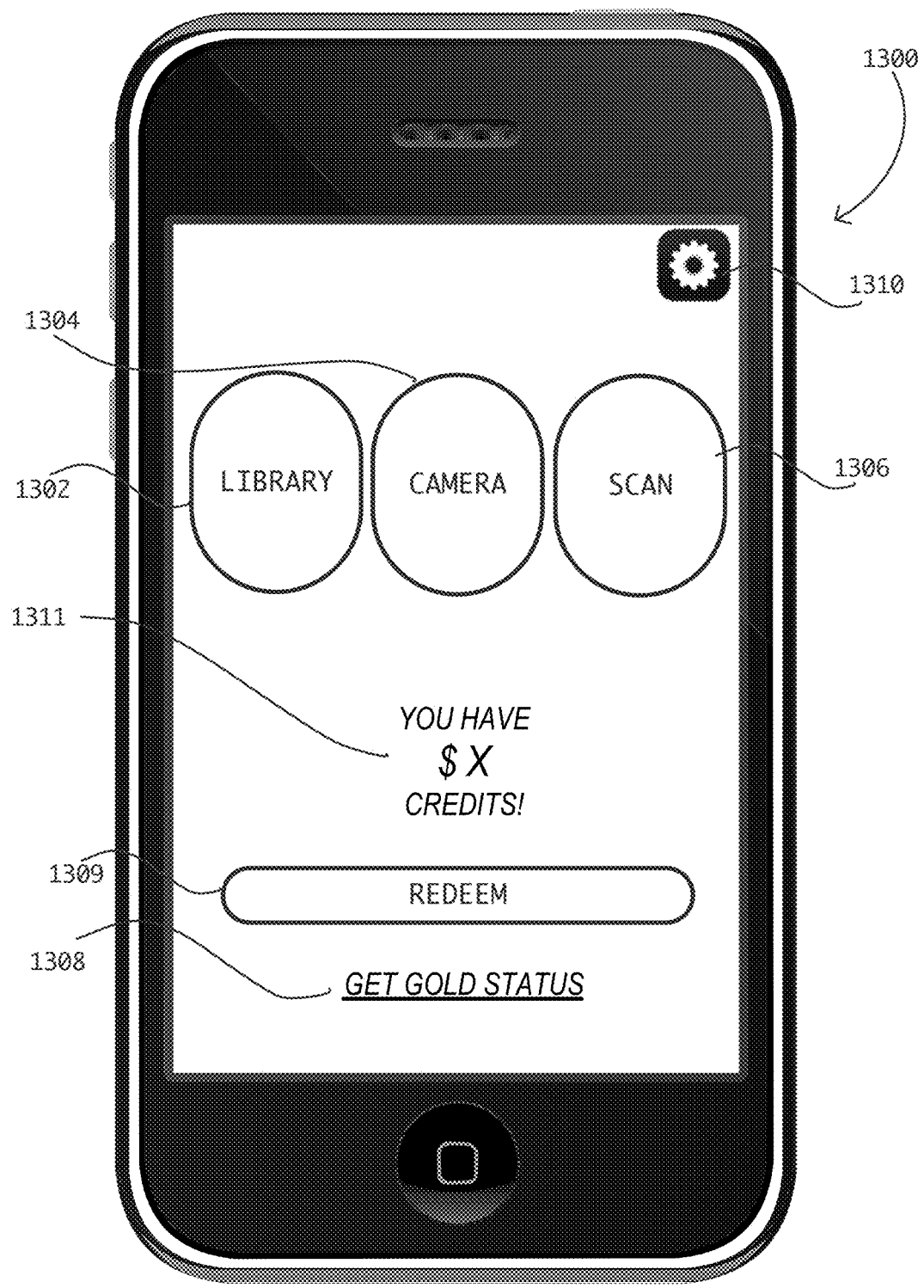
FIG. 13 is a front view of an illustrative user terminal having rendered thereon a graphical user interface to be operated by a user in selecting user content for sharing and a destination sharing platform therefor, in accordance with another embodiment of the invention.

The user first clicks the 'publish picture' or 'publish video' button rendered by the graphical user interface of the app. In response, the user is asked if they want to take a new picture/video or use an existing one from their photo/video library, and a user content selection is made accordingly. Alternatively, the user's camera application may be configured to interface with the integrated content publishing application, whereby a 'sharing' function integral to the camera application lists the option of sharing selectable recent or past content via the integration application, as opposed to direct sharing via one or more other resident applications (e.g. email, texting, Facebook™, Twitter™, etc.) In the example of FIG. 13, the user is presented with three selectable options, namely Library 1302 to select an existing picture/video, Camera 1304 to take a new picture/video, and Scan 1306, which will be described in greater detail below. Other options may also include a link 1308 that leads the user to expand on their current profile in seeking to upgrade compensation to a gold status level, and/or an app settings function 1310, for example allowing the user to select sharing platforms that may be accessed by the app, setting privacy settings (e.g. allowing the application access to a user position/GPS, sharing preferences, etc.), preferred brands and/or brand types, and the like. A current user compensation balance 1311 may also be provided, as well as a redeem function 1309 that allows the user to select a redemption option (e.g. apply credit to related service provider invoice, receive purchase credit for a sponsored online shopping platform such as iTunes™ store or Amazon™, for example, transfer credit to a registered bank account or via e-transfer or PayPal, etc.) and/or implement a direct transaction based on a preset compensation transaction configuration.

Figure 14:
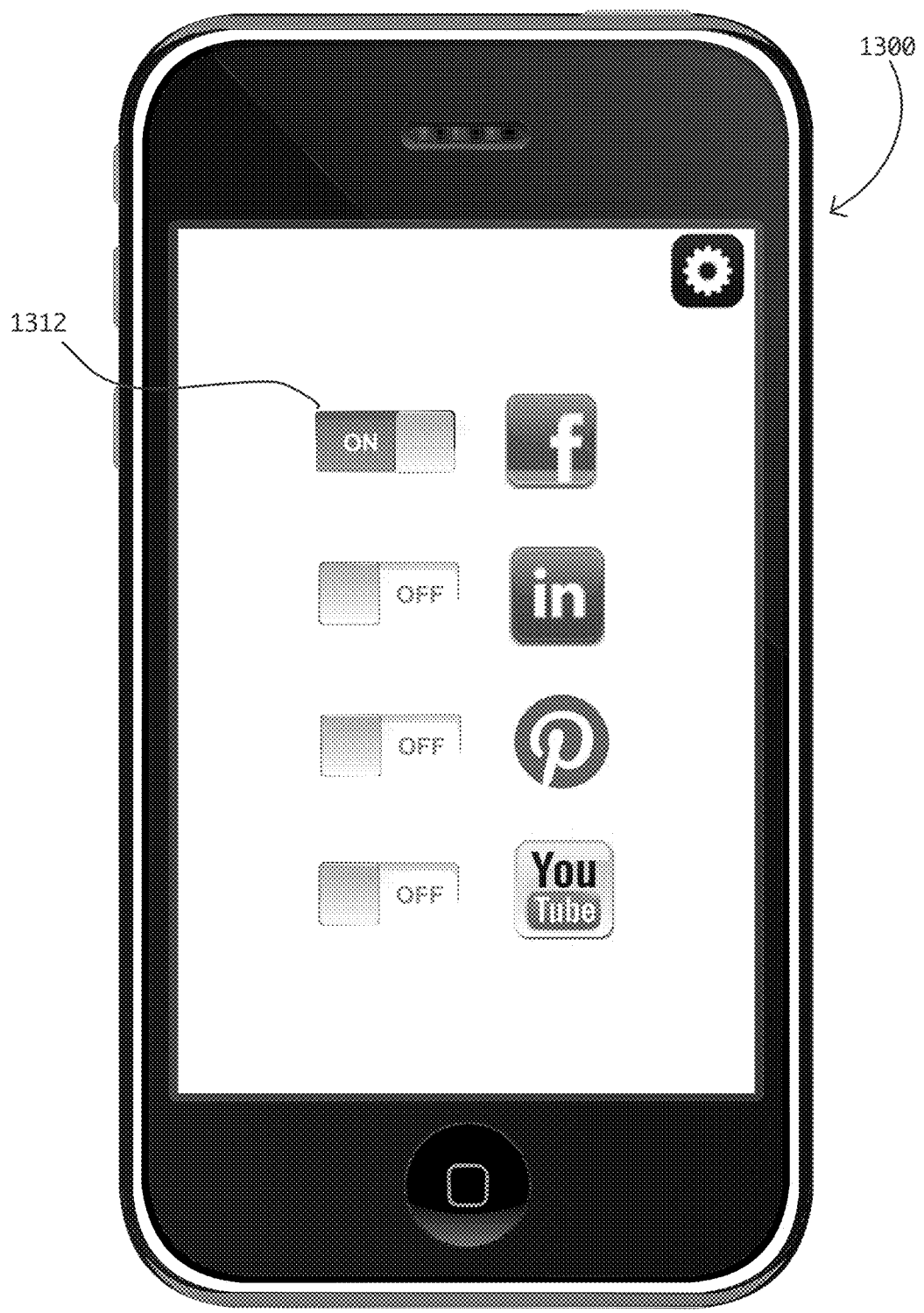
FIG. 14 is a front view of the illustrative user terminal of FIG. 13, having rendered thereon a graphical user interface to be operated by the user in selecting one or more sharing platforms on which to share the selected user content.

Upon selecting the desired user content from a local digital library or from newly acquired user content, the user is then asked to select, as shown in FIG. 14, which social network to publish to (e.g. one or more selectable options from a list of available social networks the user has access to). In this example, the user has enabled publication access via the application to its Facebook, LinkedIn, Pinterest and YouTube accounts, and for this particular post, selected to post the selected content to Facebook (selection toggle 1312).

Figure 15:
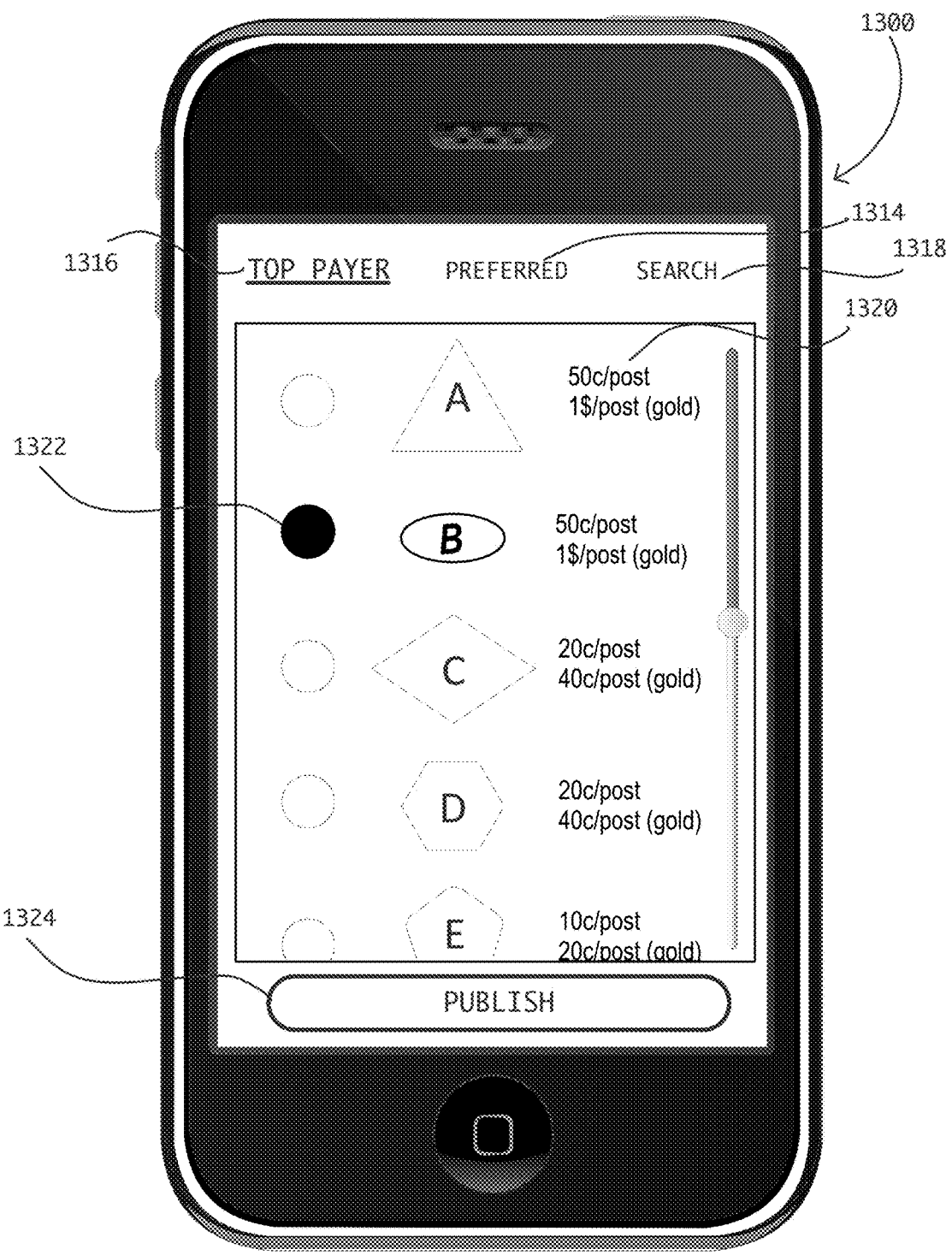
FIG. 15 is a front view of the illustrative user terminal of FIG. 13, having rendered thereon a graphical user interface to be operated by the user in selecting a preferred brand for integration within the selected user content.

With reference to FIG. 15, the user is then presented with a list of external content providers they can chose from to adorn their content with. In one example, the list may be configured based on user selection from one of the following options: preferred vendors 1314 (e.g. as selected by the service administrator and/or based on accessible user preferences such as previous user selections and/or those external content providers deemed most relevant based on user characteristics/profile attributes, geography, demographics, etc.), top payouts 1316 obtained from the service (e.g. those sponsors offering the highest rewards), and a searchable list 1318 (e.g. identified in response to user-entered keywords or the like). Other listing approaches may also be considered without departing from the general scope and nature of the present disclosure, as can alternative payment schemes such as for compensating repeat or default brand selections, increasing compensation for influential social network users and/or users providing particularly broad exposure (e.g. expansive list of contacts, friends and/or followers), etc. For each external content provider line in the list, an associated credit amount 1320 is listed so to entice users to select higher paying providers, and similarly entice providers to offer higher payouts. In one embodiment, the listed credit amount may be set as a function of the payment amount that was negotiated with the external content provider by the integrated content posting service provider, the user's membership status (e.g. 50% if basic member, 100% if gold member), and/or the number of social networks selected, for example.

With the preferred content provider selected, in this example brand "B" 1322, and upon the user activating the app's 'publish' button 1324, the user may be requested to enter their credentials for each social network selected if not already stored in association with the user's account. Such credentials may in any event be stored by the app for future use. The user may also have the option to enter a comment or description to be posted along with the user content, such as a tag line or the like, as commonly available would the content otherwise be directly posted to the selected sharing platform.

The user selections/confirmations completed, the app begins asynchronous upload of the content to the content integration and sharing system servers, while the app interface displays an upload/processing status to the user. Once the content has been uploaded and processed through a content-appropriate external data integration process (e.g. image vs. video), the servers upload the content to the selected social network(s) and calculate a corresponding credit to be applied to the user's account. The user's contacts, friends, etc., or again the public at large if the post was made publicly accessible, may then access the user's externally-integrated content.

Figure 16:
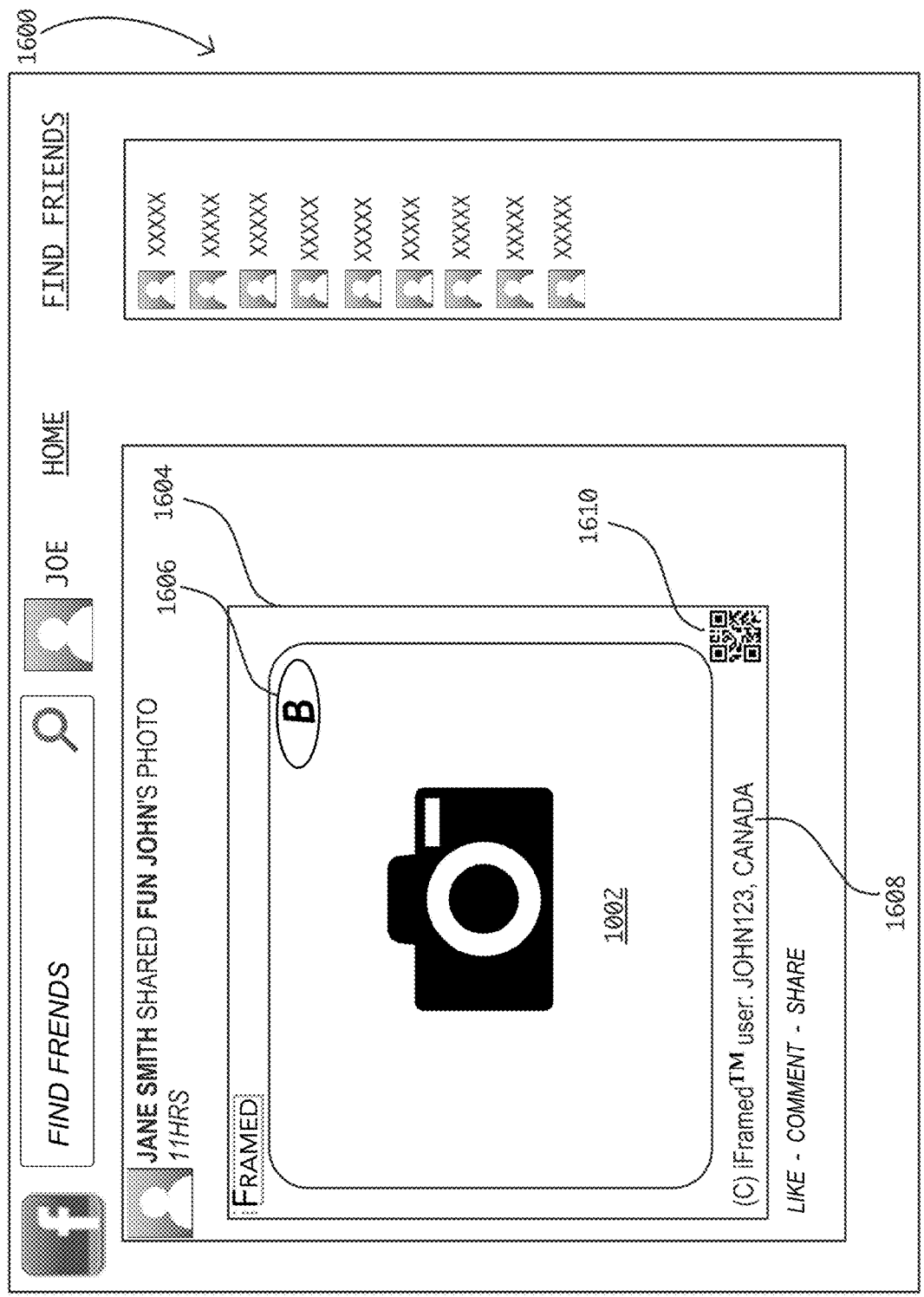
FIG. 16 is an exemplary screenshot of integrated content originally posted by a content originator on a content sharing platform page and subsequently shared by a contact of the originator on their content sharing platform page to be viewed by respective contacts thereof, wherein the content originator is integrally identified by the integrated content and the integrated content item is further itself uniquely recognizable by an integrated scan code, in accordance with one embodiment of the invention.

With reference to FIG. 16, the user's post then becomes sharable via traditional platform sharing functions, the integrated content being integrally embedded within the original content as if originally forming part thereof. In this particular example, and following from the example of FIG. 10, JOE's page shows on a recent post 1604 that includes JOHN's picture 1602, that JANE SMITH has shared this picture 1602 as one of FUN JOHN's pictures. Since JOHN originally posted this picture using an automated external content integration and sharing method and system as described above, the picture 1602 has embedded therein a selected external branding component or icon 1606, in this example for local restaurant "B" in accordance with JOHN SMITH's explicit selection as shown at FIG. 15. The posted picture 1602 also has integrated therein a content originator identifier 1608, in this example consisting of "©iFramed™ user: JOHN123, CANADA", namely identifying both the source posting application "iFramed" and the username or alias used by the content originator with this application.

In this example, the posted picture 1602 further has embedded therein a scan code, such as Quick Response (QR) code 1610, which uniquely identifies the posted integrated content and, in one embodiment, the content originator. In accordance with one embodiment, the embedded QR code 1610 serves to track acknowledgement of the posted content by content viewers, which may also be users of the content integration system. For example, upon viewing the posted content, a viewer who is also a integrated content sharing system user may activate the content integration application, for example as shown illustratively rendered in FIG. 13, and select the Scan option 1306. In doing so, this viewer's device may automatically launch a resident or internal QR scanner to scan the embedded QR code on the posted image 1602. For example, in one scenario, the viewer could be viewing the posted integrated content on a laptop or tablet and, upon identifying the integrated scan code, launch the content integration and sharing application on their camera phone to read the posted scan code and activate related content viewer acknowledgement and optional compensation features. Alternatively, where the user is viewing the integrated content via their smartphone, for example, a resident or integrated QR scanning function or application may be invoked to scan the viewed image directly on the phone, either by saving the image to storage and uploading it into the scanner, dragging and dropping the QR code embedded image into the scanner, selecting the QR coded image or QR code segment thereof using a code scanning area tool, or other functions allowing recognition and scanning of the QR code. In one particular example, the scan function of the content integration and sharing application could allow for either of a direct picture scan of a QR code viewed on another device, for example, or allow for the upload of a stored picture of the QR code, for instance stored on the viewer's smartphone upon the viewer taking a screen snapshot of the smartphone while viewing the QR code-embedded content on this same smartphone.

In one example, this scanning action serves to compensate the content originator, who may accumulate compensation as a function of the number of times his content is scanned, namely, as a function of the number of times viewing of the originator's branded content is acknowledged. The scanning action may also serve to compensate the scanning viewer for acknowledging viewing of the branded content, which also acts as encouragement for this viewer to subscribe to the content integration and sharing service if not already a subscriber, and possibly seek out viewing of such brand-integrated content. Namely, viewership may be further encouraged as registered users may be compensated both for posting branded content, but also for seeking out and viewing such branded content.

Using this approach, branded content viewership can be more accurately tracked both within the same sharing platform to which it was posted, but also across platforms both where the content was currently posted to multiple platforms, but also where shared content is subsequently reposted (e.g. shared, retweeted, etc.) to a same platform and/or to other distinct platforms. In fact, even when an integrated content item is locally saved to storage by a viewer and later reposted via another medium, the integrated QR code may nonetheless be scanned and thus acknowledge further brand exposure, resulting in further compensation for the content originator. This may also apply where the posted brand-integrated content is printed and displayed.

As the unique content item code can be tracked concurrently with those viewers who have acknowledged its viewing, viewing compensation can be limited to a single viewing credit per viewer per integrated content item, for example.

Since registered users of the content integration platform will generally provide accurate/legitimate contact and/or demographic information in registering to the service in order to receive compensation for their use of the system, external content providers will in response receive valuable information not only on the content originators selecting to push their brand, and their social network to which the branded content was pushed, but also confirmed viewership of this embedded branded content by virtue of the scan code concurrently embedded within this integrated content.

In a same or other embodiment, viewer acknowledgement may also or alternatively be provided by non-system users, for instance by scanning the code using a non-native scanner, which may redirect the scanning device to a viewer acknowledgement page or function, and optionally invite the viewer to register as a compensated user of the external content integration and sharing application.

In a further example, the use of such scan codes may further allow for sponsorship campaigns for raising funds for a particular cause or group. For instance, an integrated content image could be posted by a user with the pledge that any compensation provided to the user for the post will be donated to a charitable organization or in support of a particular cause (e.g. political party, lobbying effort, disaster relief fund, research, etc.), and thus requesting that the posted content be acknowledged by as many viewers as possible to increase the originator's compensation credits. Likewise, the sponsor may also donate viewer credits to the same cause.

While the above contemplates QR codes, other scan codes may be considered to provide similar results. For example, basic bar codes may alternatively be used, as could an encoded alphanumeric code or serial number recognizable, in one embodiment, via optical character recognition (OCR). In yet other examples, branded content exposure may be quantified using dedicated Web crawlers that are configured to crawl publicly or otherwise accessible sharing platform pages, posts, etc. (e.g. public social network profiles, etc.) to locate and automatically recognize embedded codes to track appropriate exposure-based compensation for content originators. Other approaches to branded content exposure tracking may include, but are not limited to, accessing the number of integrated branded content shares, likes, comments and/or retweets, for example, or other such metrics accessible via respective sharing platforms of interest.

The system as described may also provide a central Website for consultation by current and potential users, and provide various information pages and/or administrative portals for users to access and manage their accounts. For example, the home page may include a brief description about the service and its benefits and guide new users to a signup page and link to download the app. Other Webpages may also be included to provide different information as appropriate. The Website may also include a customer portal where user's may update their contact, account and/or profile information, for example, or again access account balances, payment history, average credit accumulation rates and some tips or suggestions for increasing their compensation rate through selection of different system parameters or preferences.

The system may further include an administrative portal to allow system administrators to perform one or more of the following tasks: view registered users, their details and perform management (edit, archive, etc.); view accumulated credits using the system by a specific user or group thereof (e.g. demographics); and view payment history applied to a specific user or group thereof.

An External Content Management portal may also be provided to allow administrators to add/archive/modify an external content provider in the system; modify the parameters of the external content provided by the external content provider (e.g. image, geography such as Province or State level, payout/credit rate, period such as start date and end date), for example within the context of a prescribed campaign.

External content providers may also themselves gain access to the system, for example via the External Content Provider Management portal or a segment thereof to distribute some of the external content provider input duties, allow them access to a status of their prescribed campaign (how many views, integrations, payouts, etc.) and possible access to system user statistics in validating or encouraging revisions or updates to their campaign strategy.

As will be appreciated by the skilled artisan, other portals, features and functions may also be provided in different configurations of the above-described system, and that, without departing from the general scope and nature of the present disclosure.

For example, while the above examples contemplate postings and content shares on what may be qualified as permanent and/or semi-permanent platforms (i.e. posted and shared pictures/videos on Facebook™, YouTube™ and the like can, unless removed, remain accessible to contacts and/or the public indefinitely, particularly if perpetually reshared, retweeted, referenced, liked, favourited, and/or commented on as it virally propagates throughout a given platform and/or migrates to other sharing platforms), the above considerations may also be of relevance for platforms centered on temporary or short term content postings and/or access. For example, platforms like Snapchat™ that allow a user to select a post duration (usually in the order of 1 to 10 seconds), may also wish to ensure their content is embedded to identify them as the originator and/or to carry the benefits of embedded external content. Ultimately, once a user's content is integrated with embedded external content such as external items and/or the originator's identity/identification, this integration is intended to persist for the digital life of this original content as it is propagated over different sharing and/or communication platforms. Accordingly, not only will the content originator potentially benefit from the integration of external content as the content migrates amongst the user's contacts, friends, followers and the like, and their respective contacts, friends, followers and the like, or again the public at large in the context of some sharing platforms, the user may also benefit where, for example, a virally distributed content item finds its way to mass media, such as is now commonplace with popular posts, pictures and videos that, at some point, can be broadcast as part of a television network's programming (e.g. news broadcast, regular content programming, etc.), online streaming video broadcasting/programming, printed media, and the like. These and other such considerations should now be apparent to the person of ordinary skill in the art, and are therefore intended to fall within the general scope and nature of the present disclosure.

Figure 17:
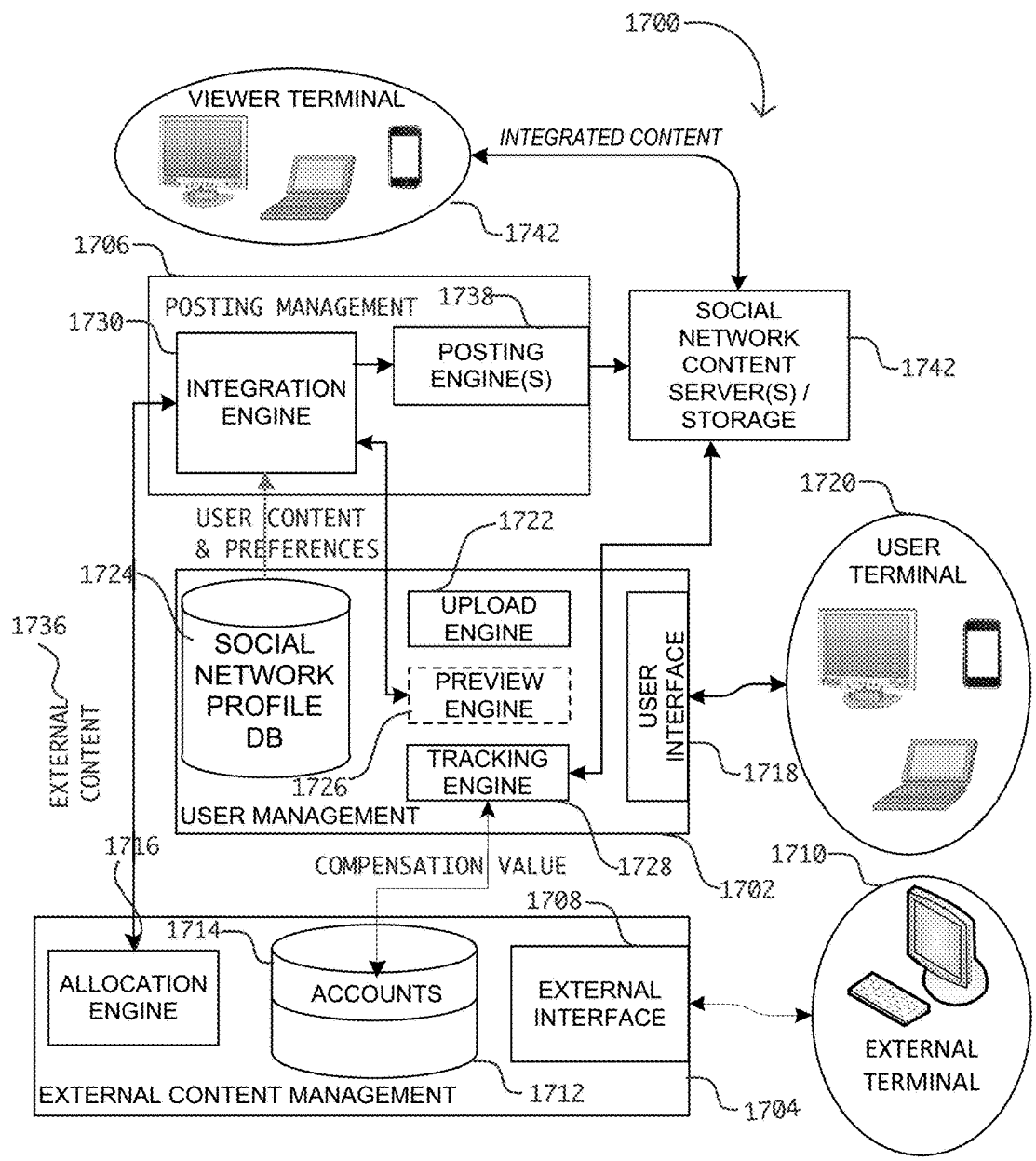
FIG. 17 is a high level diagram of a user content sharing platform providing an automated external content integration function, in accordance with one embodiment of the invention.

With reference now to FIG. 17, and in accordance with one embodiment, an example of a user content sharing platform 1700 will now be described in which an external content integration function is implemented directly by the sharing platform as opposed to a third-party content sharing facilitator application or the like. The system 1700, much like that of FIG. 1, generally comprises a user management module 1702, in this embodiment serving to manage users registered to use the sharing platform via, for example, a user profile or the like such as those common to social network sharing platforms or the like. The system 1700 further comprises external content provider management module 1704 and a posting management module 1706.

The external content provider module 1704 again generally consists of a network-accessible module having an interface 1708 accessible from an external content provider terminal 1710 that allows external entities (e.g. third party external content providers) to upload and characterise external content, define target audiences (e.g. user demographics, targeted sharing platforms, etc.) and set different parameters generally associated with the establishment of a comprehensive online campaign (e.g. user compensation rates, rules and options). Generally, the external content provider may access the system 1700 through the interface 1708 and upload external content (e.g. still images, pictures, videos, icons, emblems, taglines, links, text, logos, etc.) and campaign parameters in an external contents database 1712, and execute the transfer of funds in association therewith for tracking via a corresponding accounts database 1714. Once the campaign is defined and ready to implement, an allocation engine 1716 may be operated to actively select appropriate external content from the database 1712, for example based on one or more user preferences, demographics or the like, for integration with selected user content, as discussed below. Compensation for the operator of the system 1700 and its users may be drawn from the external content providers' accounts based on one or more pre-set compensation rules or the like as defined in the external content provider's campaign.

The user management module 1702 also generally consists of a network accessible module having a user interface 1718 allowing platform users access, via a respective user terminal 1720, to the system's various functions and features. In some embodiments, the interface provides for dynamic interaction of the user with the system 1700 via an online web application interface. The system may otherwise or also interface with users via a dedicated client application interface locally implemented by the user's terminal 1720 (e.g. via a smartphone or tablet app locally stored thereon and operated therefrom).

In these and similar examples, the user interface 1718 allows for user selection of contents (e.g. text, images, photos, videos, etc.) to be shared on the sharing platform, and optionally selection of different external content integration preferences or parameters to customize user interactions with and benefits from using the system's external content integration function. Illustratively, the user module 1702 comprises a user content upload engine 1722 for uploading user content and preferences/selections to a user database, such as social network profile database 1724, an optional preview engine 1726 for allowing the user to preview and confirm posting of the integrated content once generated, and a tracking engine 1728 to track integrated postings and incremental benefits associated therewith, and manage compensation to be transferred from the respective external content provider accounts 1714 to the user accounts accordingly. The user database 1724 may also include, as discussed in greater details below with reference to an exemplary embodiment, a content originator management function 1742, whereby the originator of each content element posted or shared via the system 1700 is not only embedded with external content, but also embedded with an integral mark or identifier as to the content's originator and thus traceable to the originating user via the user database 1724, for example.

In some of the examples described in greater detail below, further user-specific information, such as demographic information (e.g. age, sex, status, residence, etc.) may be used to guide selection of the external content and/for be used in the generation of a user-specific identifier or content qualifier to be integrated with the external and user contents. Further data, such as the user's current geographical (e.g. GPS) position, or a location associated therewith, may be accessed from the user's terminal and used accordingly. Likewise, a time and/or date may be used to visibly and integrally tag the content in the form of an integrated tag (e.g. as opposed to metadata common to enhanced digital image formats but generally unavailable from posted contents). Even when not used to integrally tag content, such data may nonetheless be tracked in association with posted content for later consideration, by the user or the authorities in identifying the time, date and location a given content item was posted.

The posting module 1706 illustratively comprises an integration engine 1730 for assembling integrated content to be posted from user content and preferences accessed from the user database 1724, and the external content 1736 accessed from the allocation engine 1716. The integration engine 1730 may also process integration of a content originator mark or identifier, as noted above, or other related information or parameters.

In one example, the integration engine will receive as input the selected user content and user preferences associated therewith (e.g. individual content or post-specific preferences, general user-specific preferences, originating user identifier or marker, uniquely generated scan code, etc.) and communicate these preferences, or a relevant subset thereof, to the allocation engine 1716 that will select appropriate external content items or elements for integration with the user's content based on those preferences. Once all relevant user and external contents are made available to the integration engine 1730, it will proceed to integrate the external content with the user content (e.g. embed, adjoin, overlay, juxtapose, etc.), again optionally consistent with relevant user preferences, to be posted via the posting engine 1738 to the sharing platform's social network content server/storage 1742, for example. Once posted, the integrated content may be viewed, liked, shared and in some embodiments interacted with by contacts of the user (e.g. friends, followers, etc.), via an appropriate viewer terminal 1742 (e.g. smartphone or cellular phone, laptop, tablet, desktop, etc.)

Figure 18:
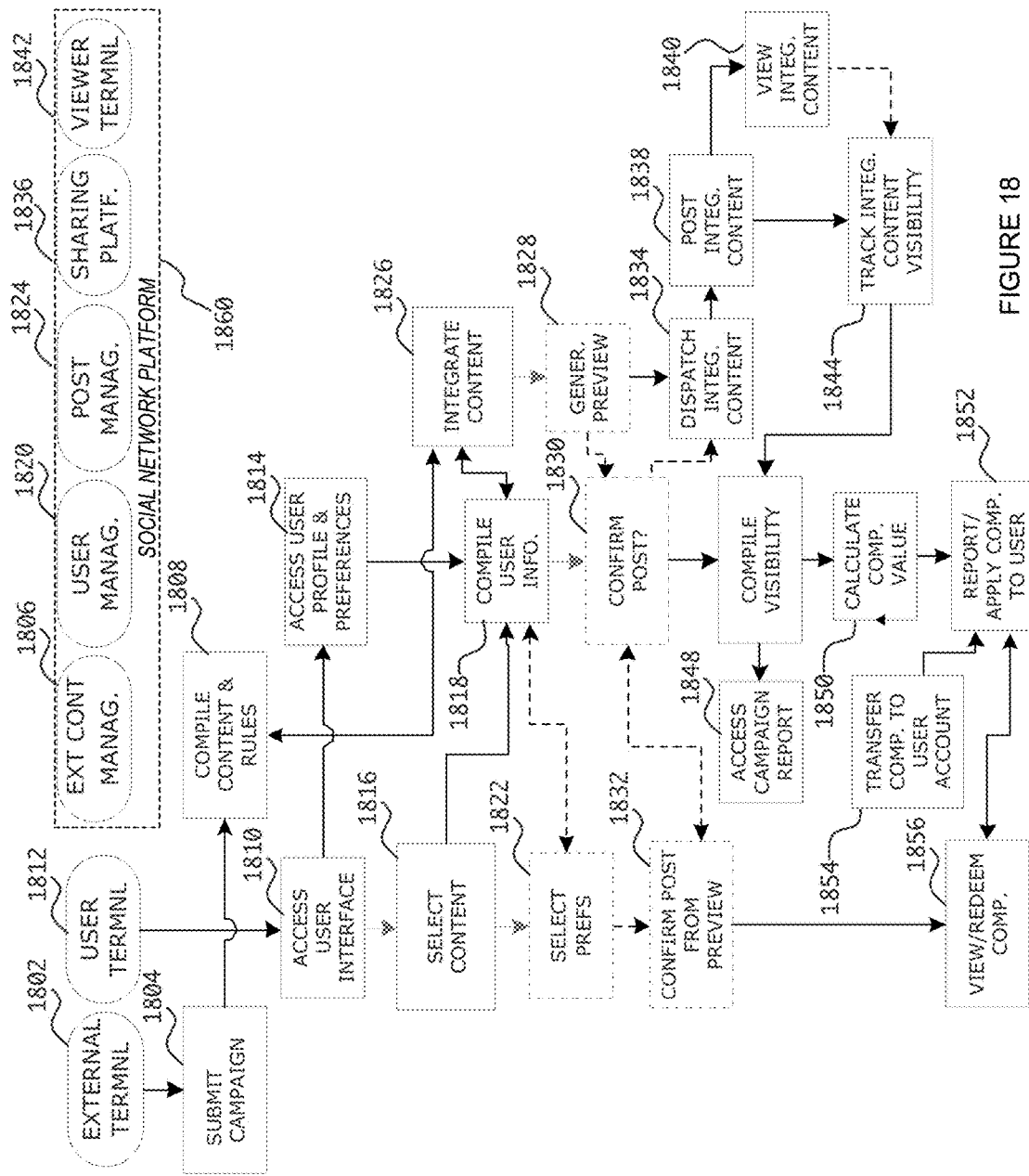
FIG. 18 is a process flowchart for a user content sharing platform providing an automated external content integration function, in accordance with one embodiment of the invention.

With reference now to FIG. 18, and in accordance with one embodiment of the invention, an exemplary process flow implemented within the context of the content sharing platform described above with reference to FIG. 17, will now be described. In this illustrative sequence, an external content provider terminal 1802 is first used to submit a campaign at step 1804 to an external content provider management system 1806 of the social network platform 1860. At step 1808 the campaign is compiled to produce one or more external content items, formats, preferences and/or rules based on the submitted campaign.

In this example, at step 1810, a new user accesses the system's user interface via a user terminal 1812 to access and set up a new social network profile and account at step 1814, for example in setting posting preferences (e.g. external content integration levels, preferences, etc.), account/compensation settings (e.g. coordinates where monetary compensation may be directed; accounts such as phone, internet, television accounts to which compensations may be applied, etc.), and the like. In some embodiments, the registration process may include the download of a client application to be operated from the user's device, or the provision of a user-specific social profile link or access page. Other examples may include the establishment of a web-accessible account whereby a system username and password may be established to provide the user access to the web-enabled system. Other examples may also readily apply, as will be readily appreciated.

Once the user's account has been established, the user may select user content to be shared at step 1816. This may include locally or remotely stored content, or again include the dynamic activation of a content acquisition application on the user's device (e.g. camera, video recorder) to acquire and preview new content.

At step 1818, the selected content is compiled along with relevant user preferences, presets and the like, by the user management system 1820 of the social network platform 1860. Relevant information may be accessed from the user's account or profile (e.g. where posting and/or external content preferences have been preset at step 1814), the user's current selection as provided through the user terminal either at step 1816, or via a separate optional external content preference selection step 1822 implemented through the user interface. This user information is then communicated to the integration engine of the platform's post management system 1824, which uses this information at step 1826 to query the allocation engine of the external content provider management system 1806 and the external data available thereto as compiled at step 1808. The optional user preference selection step 1822 may also be initiated by the integration engine through the user interface, as can other configurations and permutations, without departing from the general scope and nature of the present disclosure.

As noted above, additional user data may also be compiled at this step, for example extracted from the user's profile stored by the user management system 1820, to provide for the embedding of a digital certificate or mark of originality with the original content to be posted/shared, such as a visible or invisible mark or identifier associated with the originating user. Accordingly, once the integrated content is posted or shared, the content's originator will be integrally identifiable from the integrated content itself, and optionally traceable via the system's user database 1824, for example (e.g. via name recognition, a uniquely defined scan code such as a QR code or serial number, and the like). Other user-related data, such as birthday, location, residence location, age, sex, status, etc. may also be used to enhance user-specificity.

In one embodiment, an integrated content preview may be generated at step 1828 and communicated through the user interface at step 1830 to the user terminal 1832 for confirmation. Once confirmed, or where integration is preapproved by default, the integrated content is dispatched by the posting server/engine/gateway at step 1834, and posted by the sharing platform 1836 at step 1838. The integrated content can then be viewed, accessed and/or interacted with at step 1840 via an appropriate viewer terminal 1842, generally within the context of another user of the sharing platform 1860 such as friends, contacts or followers of the user, or friends, contacts or followers directly or indirectly linked thereto.

At step 1844, the integrated content visibility is tracked, for example via the sharing platform's internal tracking functions (e.g. tracking viewership, likes, comments, shares, reposts, etc.) and communicated to the user management system 1820 where it is compiled against the user's account at step 1846, and reported to the external content provider at step 1848. The visibility is then processed against one or more compensation rules at step 1850 and reported in the user's account at step 1852 and in the corresponding external content provider's account at step 1854, in response to which a corresponding compensation credit is concurrently transferred to the user's account. The user may then view and/or redeem the compensation using the user terminal 1812 at step 1856.

Figure 19:
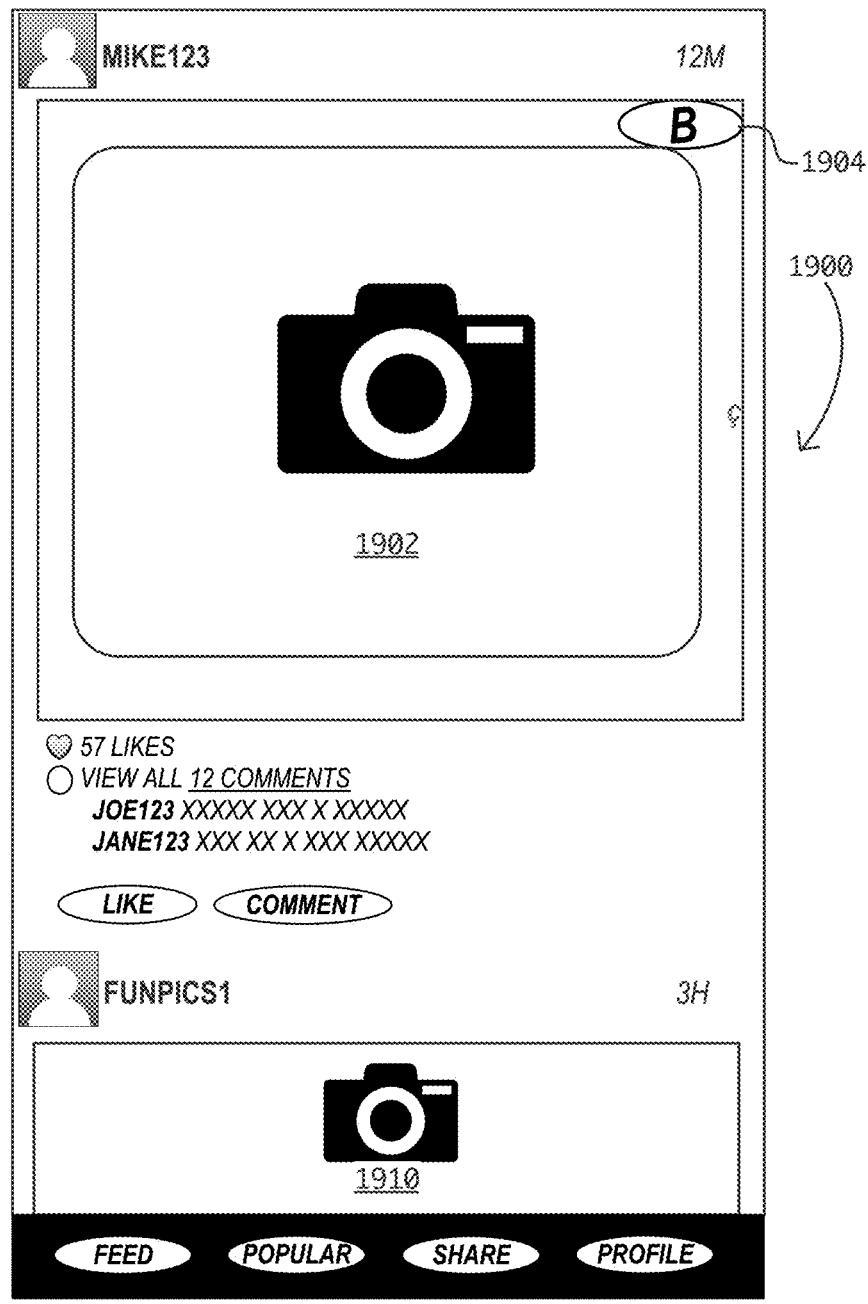
FIG. 19 is an exemplary screenshot of integrated content as posted on a image and video sharing platform, in accordance with one embodiment of the invention.

With reference now to FIG. 19, an exemplary screenshot is provided of an image and video-sharing platform, such as Instagram™. In this example, the sharing platform may be accessed directly where this platform invokes or implements an internal content integration function, or indirectly via a third party external content integration and posting application/service. In this example, the user "MIKE123" has selected to post image 1902 to the platform 1900 and have integrated therein external content such as logo "B" 1904 associated with a selected brand or external content provider (referenced as the B Restaurant in following examples). In this example, the integrated content 1902 is posted and accessible to this user's contacts, friends and the like via the sharing platform, and can generally show up within the context of this example, as part of a posting stream or board showing a succession of posted user contents (e.g. following posted content item 1910 by contact "FUNPICS1"). The posted integrated content 1902 may also be dynamically "liked" or commented on by a subset of the posting user's contacts accessing the integrated content 1902 from their respective sharing platform profiles or accounts, which may have for effect to further distribute the integrated content 1902 to respective contacts, friends and the like of these contacts. Where the integration function is internally implemented by the sharing platform, then external content visibility may be directly tracked by the sharing platform, and in some embodiments, provide corresponding compensation to the posting user as a function of this visibility. Accordingly, the more a user's integrated posts are liked or commented on, the greater the visibility and possibly the greater the related compensation.

Figure 20:
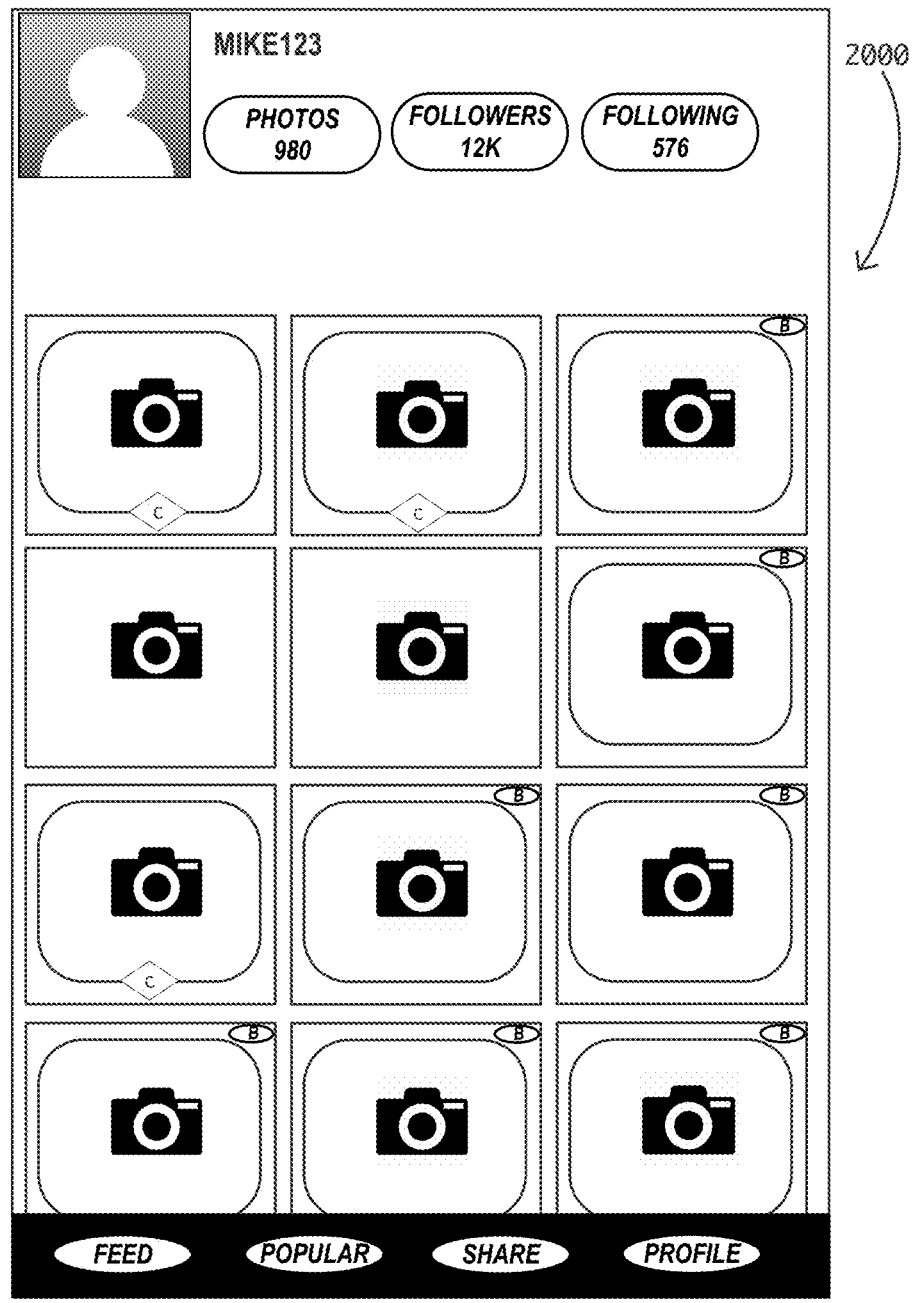
FIG. 20 is an exemplary screenshot of a user's profile on the image and video sharing platform of FIG. 19 in which a posting history for the user is shown to include postings with different external content integration selections.

Following from the above example, and with reference now to FIG. 20, an exemplary screenshot 2000 is provided of a user profile page for user "MIKE123" showing profile posting and contact details such as a number of posted images or videos, a number of users following and a number of users being followed by this user. The profile page may also provide a posting history that includes user postings with different external content integration selections, such as external content providers "B" (as above) and "C", as well as postings made without external content integration.

Figure 21:
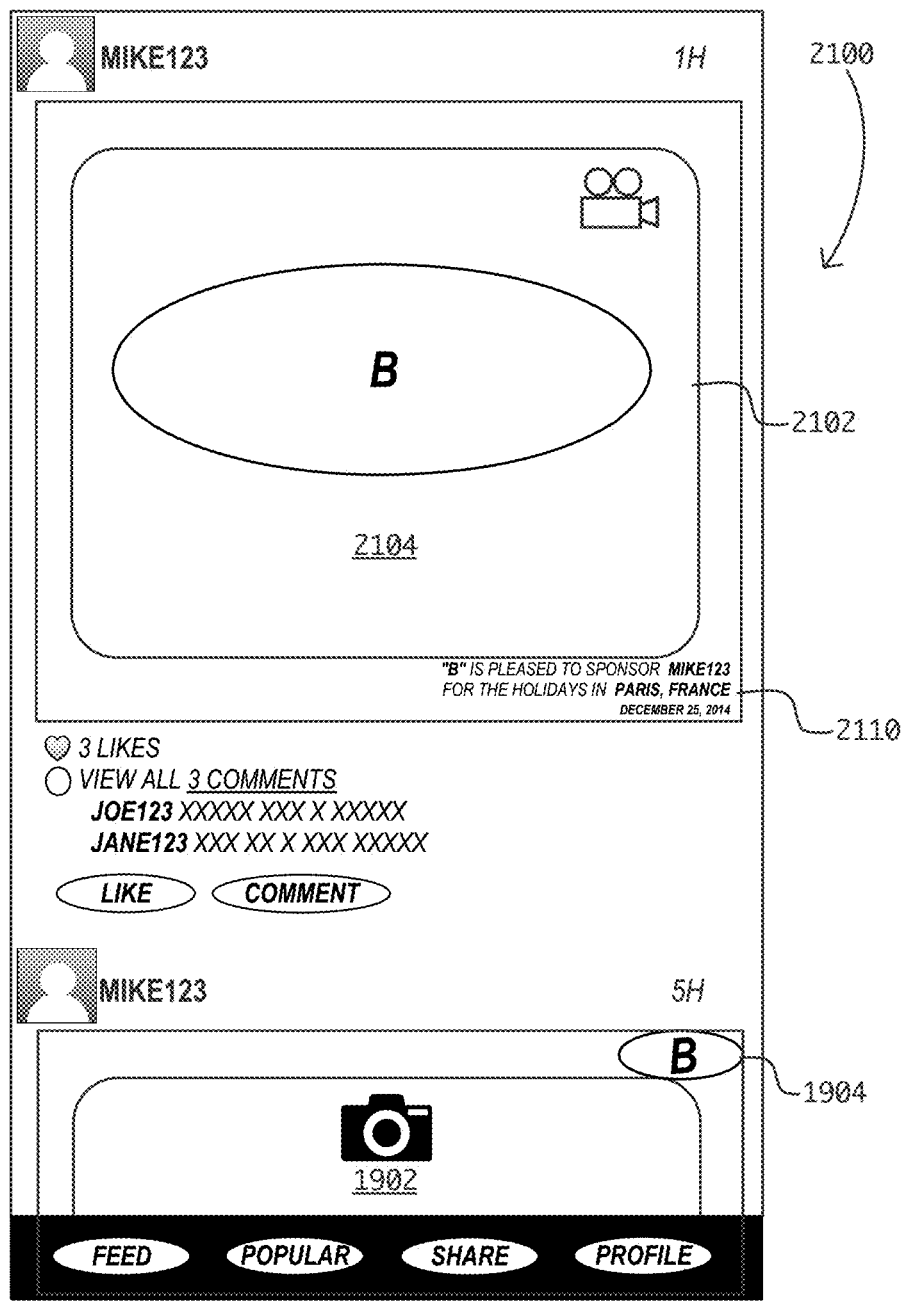
FIG. 21 is an exemplary screenshot of user-specific integrated externally-directed content as posted on the image and video sharing platform of FIG. 19 on behalf of the user by an authorized external content provider identified as sponsoring the user, in accordance with one embodiment of the invention.

Again following from the example of FIG. 19, and with reference to FIG. 21, external content integration and distribution may also be automatically initiated from a given sponsor in response to a user explicitly providing authorization to a given sponsor or external content provider to post externally-directed postings on their behalf. For example, a user having identified a preferred external content provider or branding may also activate a specific toggle on their user interface to allow an external content provider associated with this selection to effectively sponsor them on one or more content sharing platforms of their choosing. For example, in the embodiment of FIG. 21 again showing an exemplary screenshot of an image and video sharing platform, such as Instagram™, a subsequent posting 2102 includes a user-specific integrated content item 2104 posted on behalf of the user as originating therefrom, namely in the form of an externally-originated video item posted via the user's sharing platform profile (e.g. MIKE123). Including in this posting is a user-specific dedication, in this example identifying the external content provider "B" as sponsoring the user "MIKE123" and further integrating user-specific information in this sponsorship message such as the user's current geographical location (e.g. Paris, France), and date, and making reference to a current time period (e.g. the Holidays). In this particular example, the external content provider in question may have initiated a sponsorship campaign for the holidays and set to post, via authorized user-specific accounts, a seasonal video to be viewed by the direct and indirect contacts of those sponsored users via these authorized accounts. In exchange, such sponsored users may receive greater incremental compensation for such postings as would otherwise be available through direct user postings such as shown in FIG. 19. As above, dynamic compensation metrics may be defined not only as a function of the number of such sponsored postings, but also as a function of a visibility thereof as expressed by content item views, a potential exposure defined by the number of contacts associated with the sponsored user, a number of registered likes or shares, comments, etc. As with the example of FIG. 19, the sponsored posting may show on the user's own profile page as well as on their contacts activity page or board, timeline, etc., and/or again in respect of a user's public profile, for example.

Within the context of FIG. 1, the integration engine 130, in response to user-authorization, will digitally integrate a respective user identifier extracted form the user database 124 with an externally-directed content item retrieved via the allocation engine 116 to produce a user-specific integrated externally-directed content item that is then relayed by the posting server 138 to the selected sharing platform 140 on behalf of the user as originating therefrom.

In some embodiments, and as illustrated in the example of FIG. 21, the user-specific integrated externally-directed content item may be posted as a function of a posting or user activity. For example, the sponsor item may be automatically posted during a low posting activity period automatically designated as a function of a tracked posting history for the sponsored user in questions (e.g. at night or early in the morning when the sponsored user is known to rarely post their own content items), as is depicted in the example of FIG. 21.

In other examples, the sponsor item may be set to be automatically posted immediately before the user posts its own content, for instance to act as a sponsored introduction to the user's own content. For example, a user may authorize its selected sponsor to post an integrated video or image serving as a sponsored introduction to their own content, for instance slightly delaying their own content posting by a few seconds or minutes to have the sponsor content post appear immediately before their own when viewed by their contacts.

This time-shifting option may, alternatively or additionally, be used as a separate feature of the content-sharing application and interface to allow users to post items in a time-shifted manner, either to provide for greater visibility or impact on their users, or to other advantage as will be appreciated by the skilled artisan. For example, a user may opt to have their content post delayed by a few hours, for instance, when setting their post in the middle of the night but wishing to have such posts consumed first thing in the morning, or later the next day when their target audience/contacts are more likely to consume the posting.

In other examples, for instance as shown in FIG. 21, the user-specific integrated externally-directed content item may be automatically selected as a function of the user's geographical location to integrally reference this geographical location or area in the content item or again promote a local branch or venue associated with this location and related to the sponsor in questions.

Figure 22:
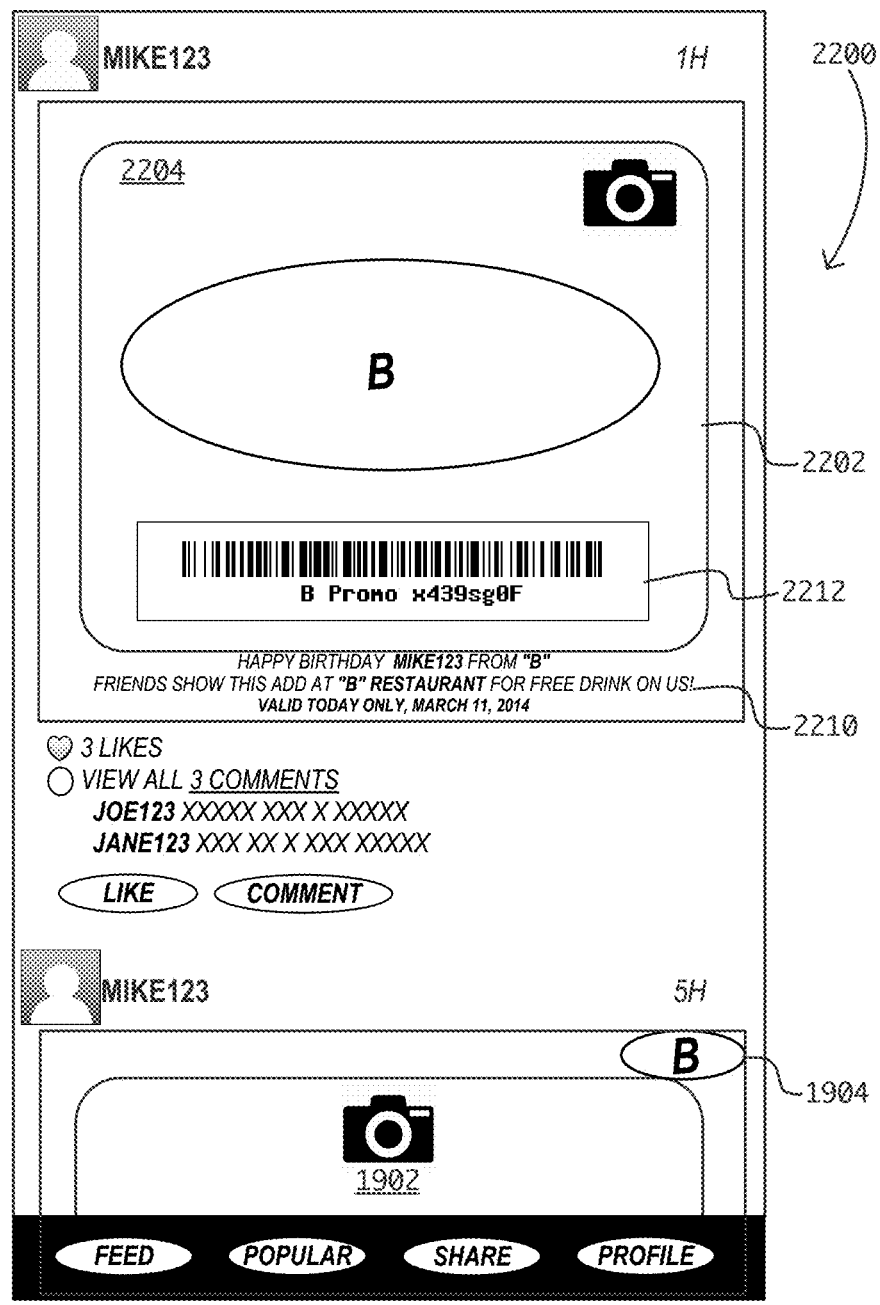
FIG. 22 is another exemplary screenshot of user-specific integrated externally-directed content as posted on the image and video sharing platform of FIG. 19 on behalf of the user by an authorized external content provider, in this example offering promotional content to contacts of the user on the sharing platform, in accordance with one embodiment of the invention.

With reference now to FIG. 22 and in accordance with another example, a user-specific integrated externally-directed content item 2202 is automatically posted in screenshot 2200 as a function of a demographic or personal attribute of the user, in this example as a function of, and to explicitly reference the user's birthday. In this example, the content item 2202 consists of a promotional image 2204 selected and posted by the sponsor "B" as originating from the user "MIKE123" on his behalf, and including a user dedication 2210 in which the user is whished a "happy birthday" from "B" and in which contacts (e.g. social network friends) of the user are also offered a promotion by showing the posted add (and displayed bar code 2212) at a local establishment associated with the sponsor to receive a "free drink" in celebration of the user's birthday. By integrating and sharing promotional content via the authorizing user's sharing platform profile, and incorporating a sponsored offer redeemable by contacts of this user, the sponsor further extends their promotional reach through a more personal and intimate channel then otherwise available. Likewise, while contacts of the authorizing user may have been less likely to consider social media adds automatically posted on their page when viewing this user's posts, they may be far more inclined to take note of it as being posted on the authorizing user's behalf as originating therefrom, and further to take advantage of the promotional offer given the personal link associated therewith.

Again, this sponsor directed add content may be further distributed through the sharing platform via likes, shares and comments, with proportional compensation associated with and/or directed to the authorizing user.

Figure 23:
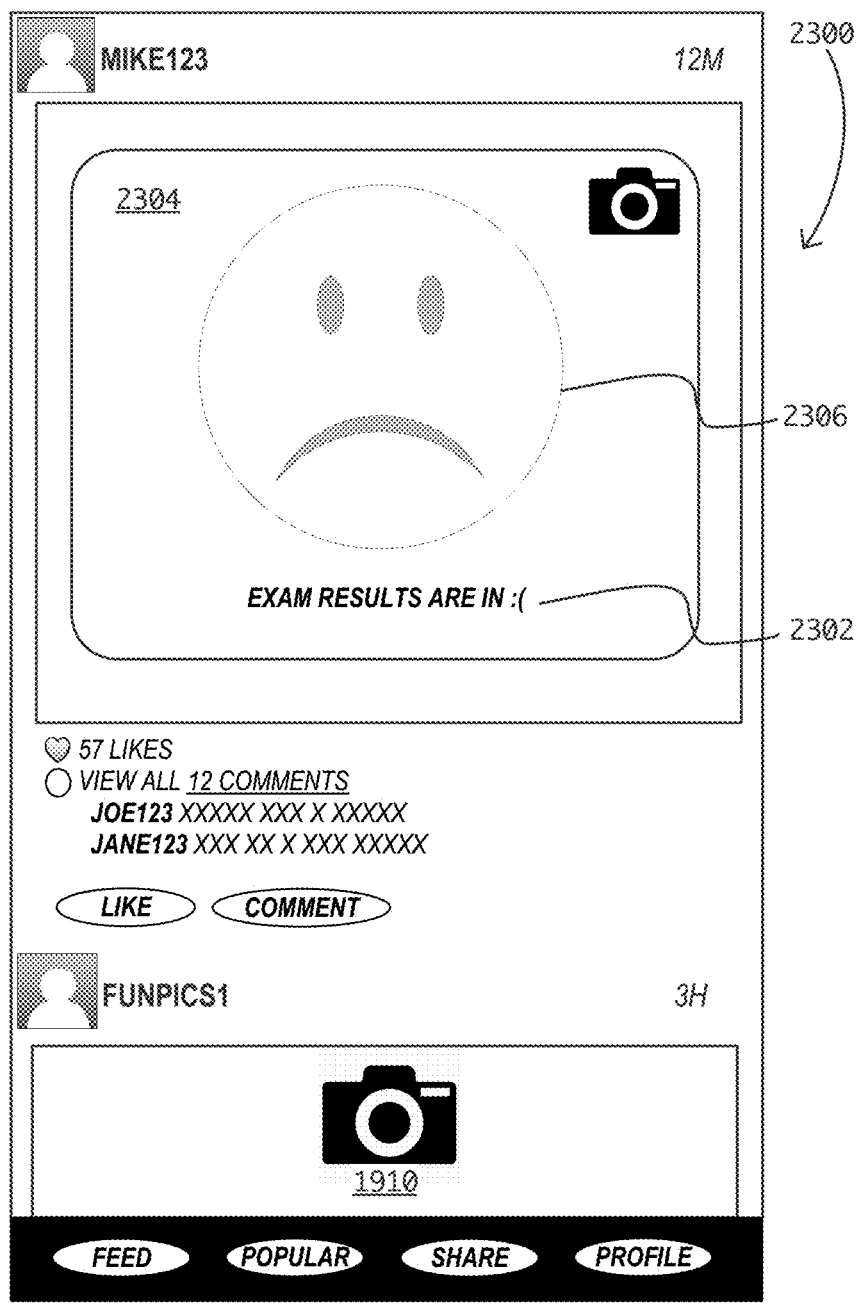
FIG. 23 is an exemplary screenshot of integrated content as posted on an image sharing platform in which a text-based message input by the user is automatically integrated into an image format to be posted on the image sharing platform, in accordance with one embodiment of the invention.
Figure 24:
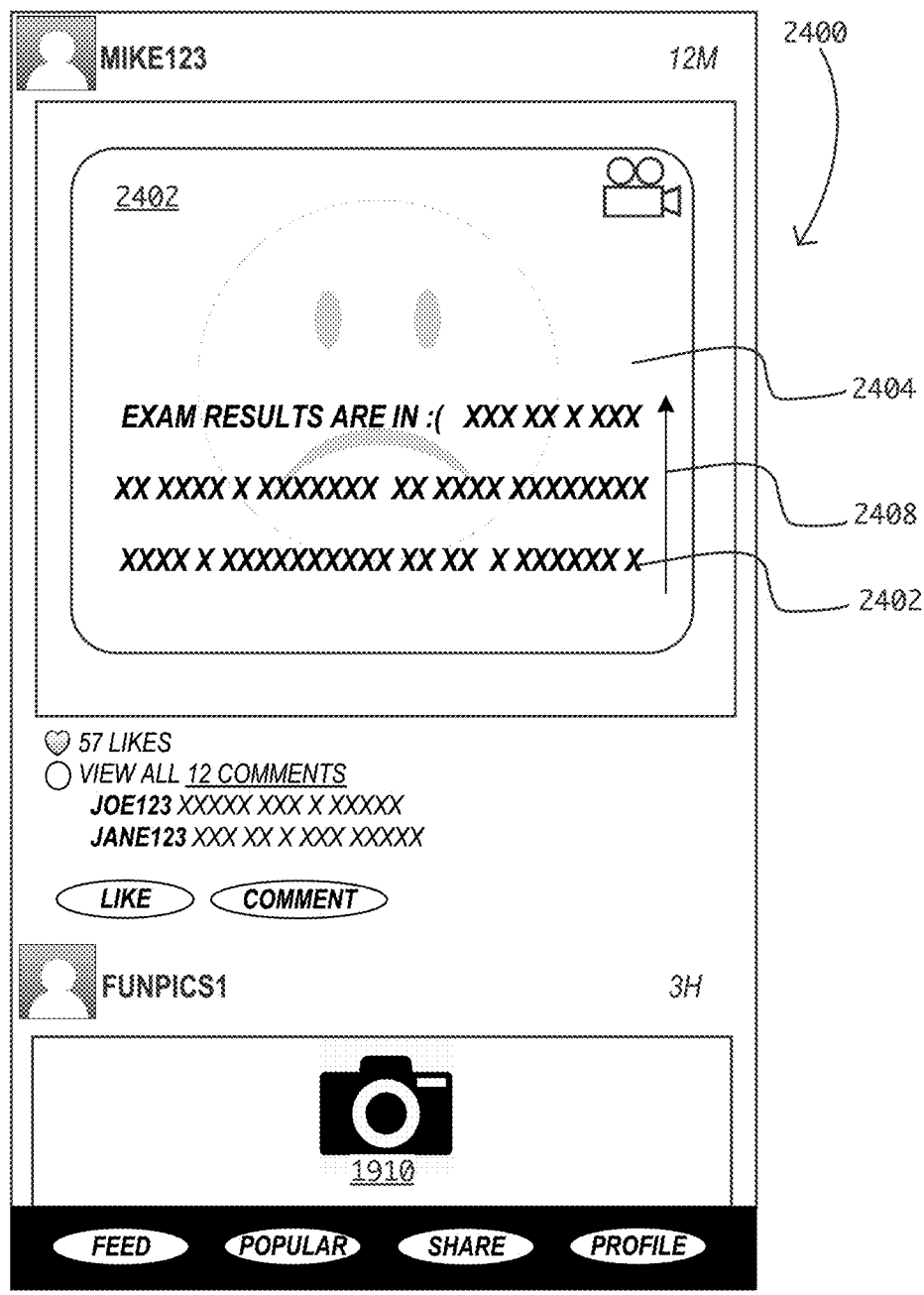
FIG. 24 is an exemplary screenshot of integrated content as posted on an video sharing platform in which a text-based message input by the user is automatically integrated into a video format to be posted on the video sharing platform, in accordance with one embodiment of the invention.

With reference to FIGS. 23 and 24, and following from the above examples, the content sharing system described herein may also provide additional complimentary and/or alternative features and functions given. For instance, as the systems illustratively shown for example in FIGS. 1 and 17 provide intermediary function between the user's own posting activity/actions and the actual postings ultimately shared via the sharing platform(s), the system's posting management functions (e.g. module 106 and 1706 of FIGS. 1 and 17, respectively) may further or alternatively act to provide other intermediary functions to further expand posting versatility.

For example, as introduced above, a user's postings may benefit from time shifts implemented through dynamic user-accessible posting management functions, as well as benefit from various user-specific data integration functions to enhance, promote, sign, customize or otherwise mark shared user content. In the former example, time-shifted postings may include delayed postings where content is first selected to be posted by the user, but selectively set to be posted on the user's behalf as originating therefrom a few minutes, hours, days or even weeks later, for example allowing such user to selectively delay or spread postings over time. In one example, this may be particularly advantageous where a user wishes to make sequential postings at a regular interval. Using current solutions, this user would have to execute each post, one by one, consistent with the desired interval. Using an intermediary posting application and service as described herein, the user could rather set up a sequence of postings and associated with each one an incrementally delayed posting time according to the desired interval (e.g. one posting per hour or per day). Along these lines the system may rather be set up to provide posting campaigns in which a user may not only select the content to be posted at each post and the time delay to be associated therewith, but also particular user information (e.g. username, date, location, user signature, status, etc.) and/or branding information (e.g. selected branding item, type or level) to be automatically integrated therein. To cap it off, the user may also optionally select to authorize a preferred advertiser or brand to post externally-directed materials on their behalf as originating therefrom to be viewed by their contacts on selected platform(s), and consequently, earn them additional rewards such as brand recognition, sponsorship, financial compensation, promotional items, etc.

With reference to FIGS. 23 and 24, and in accordance with one embodiment, the content integration system may allow for the expansion of a given post into another medium, with optional integration of external content to supplement the original user content. For example, in FIG. 23, a screenshot 2300 is provided of an image and video sharing platform interface in which a user's text-based post 2302 (e.g. a text message otherwise destined for Twitter™, SnapChat™ or other such text-based sharing platforms) is set using an embodiment of the system described herein to be automatically expanded into an image format so to be shareable over the image and video sharing platform (such as Instagram™ where text-based items are not readily shareable). In one example, the text message may be directly posted as integrated within a blank image file such that only the text-based message is ultimately depicted with optional branding, as discussed above. In other examples, the content integration engine may rather be pre-configured to incorporate a stock or standard background image as selected by the user (e.g. text-based message integrated as a layer over the user's profile picture, for example). In other examples, the user may rather elect to have each or some of their text to be automatically sponsored by a selected content provider or type, such that these text messages are automatically integrated over the external content provider's logo or branding image, for example. In other examples, the system may be configured to integrate the text-message in a dynamically selected user-related image, selected for example as a function of the time of day (e.g. night time vs. daytime scenery), user location (e.g. recognizable city skyline or backdrop, country flag or emblem, recognizable venue icon such as a sports arena, restaurant or the like, etc.), profile status or the like. In yet other examples, the integration engine may rather extract usable information from the text-based message itself to automatically select an appropriate background image reflective of the message's mood, emotion or intent, to name a few. For example, in the post 2304 of FIG. 23, the integration engine automatically identifies the user's use of the sad face emoticon or shortcut keys, such as :(, and thus integrates the user's message into a background sad face image 2306 or other image invoking sadness or disappointment as reflective of the emotion intended by user's message. On the other hand, should the user insert a smiley face into their message, a correspondingly happy background image may be selected instead for integration. Other examples based current or custom text-based emoticon and/or shortcut keys will be readily appreciated by the skilled artisan to form part of the present disclosure. Similarly, the integration engine may be configured to otherwise recognize certain keywords in a user's text message and select an appropriate background image accordingly. Furthermore, where a text-based posting is longer than an otherwise allowable text-based posting for the sharing platform at hand (e.g. tweets longer than 140 characters), the integration engine may facilitate such postings by allowing the message to be posted in its full length in an image format, which would only be restricted, for example, by the amount of text one could be reasonably expected to read within a single image post.

While the example of FIG. 23 considers the conversion of text-to-image postings, the integration engine may also or alternatively be configured to convert text-based messages into short clips or videos, for example, to be posted on image and video-based sharing platforms, or again video-only platforms such as YouTube™. For example, and as illustratively shown in the example of FIG. 24, a user's text message 2402 may be integrated into a background video 2406 or clip reflective of the user's message's mood to produce an integrated video posting 2404. Following from the above example, a message explicitly denoted as sad using the sad face shortcut keys may be integrated into a stock clip of a person crying or sitting depressed and alone on a park bench, whereas a message denoted by a happy face may rather be integrated into a short clip of a person jumping for joy or dancing. In this particular example, the user further benefits from the system's integration engine in that a particularly long text message may be scrolled (e.g. along arrow 2408). This feature may in fact become particularly attractive when considering the long text posts noted above, in which a particularly long text could be shared in scrollable video format thus further expanding possibilities as to what may ultimately be posted on otherwise text-based platforms, or what lengths of text may be ultimately posted on multimedia sharing platforms having particular limits on text-based post lengths.

To bring the above examples into the context of external content integration, a given brand or external content provider could elect to provide different mood-invoking content items for integration such that, rather than to use stock mood-specific background images or videos, a user may rather elect to have a particular brand speak their mood for them by having mood-specific external content posted as background to their mood-identifying posts as integrated mood-specific branded integrated content items. Accordingly, the user content branding would not only server to enhance the user's post by reflecting mood, but also serve to compensate the user and possibly invoke a greater response from users given the relevance of the branding to the message's intended effect, and conversely avoid possibly mismatched branding effort (e.g. integration of a particularly happy branding item to a particularly sad and serious user content item) which may result in brand criticism as opposed to positive recognition and association.

As introduced above, while the above examples have focused predominantly on the integration of external content for social media sharing platform postings, the system may also or alternatively serve to integrate external content into other user-shared contents such as text-based messages (e.g. SMS) and the like. For example, in the context of SMS messaging systems, and those similar thereto, an appropriately configured integration engine may be provided to directly or indirectly receive user text-based messages (e.g. over a wireless or landline data network) and convert these messages for communication over a telephony network (e.g. directed to a recipients cellular phone number or the like). Such data-to-telephony conversion systems are known in the art and need not be further discussed herein. In the present context, however, the user's text-based message may be integrated, as discussed above, with a branded background image or video, for example, and rather over an MMS link to the recipient's phone. Accordingly, external content integration may serve on a one-to-one (direct text message) or one-to-group (group text message) basis using the integration platform discussed herein, whereby a user subscribing to the integration service again may profit from such integration without necessarily needing to participate in any form of social media sharing platforms as considered in the above examples. Mood-specific or enhanced text-to-image or text-to-video integrations may also be considered for SMS-to-MMS integrations, as can other features described above such as external user-content integrations, location-specific integrations, delayed postings (e.g. delayed, time-shifted or interval SMS postings) as well as other brand-specific options such as authorised externally-directed SMS/MMS content postings on the user behalf to selected or grouped recipients, introductory externally-directed postings, etc. As will be appreciated by the skilled artisan, while this particular example focuses on SMS-type messaging, other messaging platforms such as Blackberry™ Messenger (BBM™), Instant Messaging (IM), etc. may also be considered for content integration enhancements and features as discussed herein.

While the present disclosure describes various exemplary embodiments, the disclosure is not so limited. To the contrary, the disclosure is intended to cover various modifications and equivalent arrangements included within the general scope of the present disclosure.

What is claimed is:

1. A system for sharing digital user-originating content via a content sharing platform using a camera-enabled user client mobile device, the system comprising:
 a network-accessible storage having stored thereon a plurality of different specifically selectable external content items associated with respective distinct external content sources;
 a dedicated client application locally operable on a given camera-enabled user client mobile device of a given user to render a dedicated graphical user interface (GUI) and execute a posting function that invokes a user-originating content selection, integration and posting process, wherein said dedicated GUI comprises:
  a dedicated user-originating content selection function that invokes a mobile client camera function of said given user client device through a dedicated GUI preview window to acquire new image or video content therewith as a user-originating content file to be shared by said given user;
  a dedicated external content item selection function receiving as input user-selection of a specific external content item distinct from said user-originating content file and selectable by said given user from said plurality of different specifically selectable external content items for being associated with a user-selected one of said distinct respective external content sources as a function of a location of said given user and for visible digital integration within said user-originating content file as a sharable digitally integrated content file, wherein a preview of said sharable digitally integrated content file is rendered in said dedicated preview window as a result of said user-selection to preview said visible digital integration of said selected external content item within said user-originating content file prior to sharing; and
  a dedicated sharing function receiving an integrated content file sharing instruction from said given user to share said integrated content file; and
an integration engine operated by a digital data processor to visibly integrate said specific external content item within said user-originating content file to output said sharable digitally integrated content file, wherein said integration engine digitally overlays or embeds said external content item within said user-originating content file; and
an output interface to share said sharable integrated content file via the content sharing platform on behalf of said given user as originating therefrom in response to said dedicated sharing function;
wherein said specific user-selected external content item comprises a specific locally sourced content item selectable by said given user amongst distinctly locally sourced content items corresponding with said location.

2. The system of claim 1, wherein at least one of said plurality of different specifically selectable external content items is associated with a prescribed period defined by a start date and end date, and wherein said at least one of said plurality of different specifically selectable external content items is only selectable as said user-selected external content item as a function of said location during said prescribed period.

3. The system of claim 1, wherein said distinctly locally sourced content items correspond with distinct local enterprises and wherein said specific locally sourced content item corresponds with a specific one of said distinct local enterprises.

4. The system of claim 1, wherein said distinctly locally sourced content items correspond with distinct local brands and wherein said specific locally sourced content item corresponds with a specific one of said distinct local brands.

5. The system of claim 1, wherein user selection of said specific locally sourced content item shows user patronage or support therefor in said integrated content item.

6. The system of claim 1, wherein said location comprises a city.

7. The system of claim 1, wherein said output interface relays said integrated content to respective contacts of said given user as defined on the content sharing platform.

8. The system of claim 1, wherein said distinctly locally sourced content items correspond with at least one of distinct local brands or distinct local enterprises, wherein said specific locally sourced external content item corresponds with a specific one of said distinct local brands or distinct local enterprises, and wherein user selection of said specific locally sourced external content item shows user patronage or support therefor in said integrated content item.

9. A non-transitory computer-readable medium comprising instructions executable by a digital processor of a camera-enabled mobile device to share digital user-originating content from the mobile device via a server-based content sharing platform; wherein execution of the instructions by the digital processor causes the processor to carry out the method of:
  rendering a dedicated graphical user interface (GUI) on the mobile device to invoke a user content selection, integration and posting process, wherein said dedicated GUI comprises:
    a dedicated user content selection function that invokes a mobile client camera function of the mobile device through a dedicated GUI preview window to acquire new content therewith as the user-originating content to be shared via the sharing platform;
    a dedicated external content item selection function receiving as input user selection of a specific digital external content item from a plurality of different specifically selectable digital external content items, distinct from the user-originating content, associated with a user location and with respective external content sources, wherein said specific digital external content item is selected for being associated with a user-selected one of said respective external content sources, to be visibly digitally integrated within said user-originating content for sharing as an integrated content item, wherein at least one of said plurality of external content items is selectable as a function of a user location, and wherein said integrated content item is previewed in said dedicated preview window as a result of said user-selection to preview said visible digital integration of said selected external content item within said user-originating content prior to sharing; and
    a dedicated sharing function receiving as input an integrated content sharing instruction from the user to share said integrated content item as previewed in said preview window; and
  relaying said integrated content sharing instruction to the content sharing platform to share said integrated content item on behalf of the user as originating therefrom;
  wherein said specific user-selected external content item comprises a specific locally sourced content item selectable by said given user amongst distinctly locally sourced content items corresponding with said location.

10. The non-transitory computer-readable medium of claim 9, wherein said at least one of said external content items selectable as a function of said user location is further associated with a prescribed period defined by a start date and end date and is only selectable as said specific external content item during said prescribed period.

11. The non-transitory computer-readable medium of claim 9, wherein said distinctly locally sourced content items correspond with at least one of distinct local brands or distinct local enterprises, wherein said specific locally sourced external content item corresponds with a specific one of said distinct local brands or distinct local enterprises, and wherein user selection of said specific locally sourced external content item shows user patronage or support therefor in said integrated content item.

12. The non-transitory computer-readable medium of claim 9, wherein said integrated content is shared with respective contacts of the user as defined on the content sharing platform.

13. The non-transitory computer-readable medium of claim 9, wherein said specific external content item is overlaid onto or embedded within said user-originating content.

14. The non-transitory computer-readable medium of claim 9, wherein said distinctly locally sourced content items correspond with distinct local enterprises and wherein said specific locally sourced content item corresponds with a specific one of said distinct local enterprises.

15. The non-transitory computer-readable medium of claim 9, wherein said distinctly locally sourced content items correspond with distinct local brands and wherein said specific locally sourced content item corresponds with a specific one of said distinct local brands.

16. The non-transitory computer-readable medium of claim 9, wherein user selection of said specific locally sourced content item shows user patronage or support therefor in said integrated content item.

* * * * *